(12) United States Patent
Kumagai

(10) Patent No.: US 8,151,722 B2
(45) Date of Patent: Apr. 10, 2012

(54) METHOD OF MANUFACTURING AIRBAG

(75) Inventor: Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 391 days.

(21) Appl. No.: 12/449,254

(22) PCT Filed: Nov. 19, 2007

(86) PCT No.: PCT/JP2007/072350
§ 371 (c)(1),
(2), (4) Date: Jul. 30, 2009

(87) PCT Pub. No.: WO2008/111260
PCT Pub. Date: Sep. 18, 2008

(65) Prior Publication Data
US 2010/0116186 A1    May 13, 2010

(30) Foreign Application Priority Data
Mar. 14, 2007 (JP) .................................. 2007-065246

(51) Int. Cl.
*D05B 11/00* (2006.01)
(52) U.S. Cl. ................................................. 112/475.08
(58) Field of Classification Search ............ 112/475.08, 112/475.17, 402, 441, 440, 433, 475.01; 280/739, 743.1, 743.2
See application file for complete search history.

(56) References Cited

U.S. PATENT DOCUMENTS
2006/0282203 A1   12/2006  Hasebe et al.

FOREIGN PATENT DOCUMENTS

| JP | 2003-335203 | 11/2003 |
|----|-------------|---------|
| JP | 2004-244005 | 9/2004 |
| JP | 2005-145226 | 6/2005 |
| JP | 2006-088998 | 4/2006 |
| JP | 2006-111255 | 4/2006 |
| JP | 2006-168566 | 6/2006 |

*Primary Examiner* — Tejash Patel
(74) *Attorney, Agent, or Firm* — Manabu Kanesaka

(57) ABSTRACT

A method of manufacturing an airbag with which an airbag having a left airbag section and a right airbag section and constituted so that peripheral edge portions of an opening of an opposing face of each bag are sewn together can be easily manufactured. An airbag 10 is constituted by a total of two panels, namely, an inside panel 20 and an outside panel 30. After the inside panel 20 and the outside panel 30 are overlapped in a double-folded state so that airbag outer side faces thereof oppose to each other, opposite sides 61, 62 are sewn together, and lower edge portions of the inside panel 20 and the outside panel 30 are sewn together. Then, the inside panel 20 is reversed so that airbag outer side faces of a right side 20R and a left side 20L oppose each other, and the peripheral edge portions of the openings 18, 18 are sewn together. Then, the remaining peripheral edge portions of the inside panel 20 and the outside panel 30 are sewn together. Then, the outside panel 30 is reversed through an opening port M on rear end sides of the inside panel 20 and the outside panel 30, and the opening port M is sealed.

3 Claims, 21 Drawing Sheets

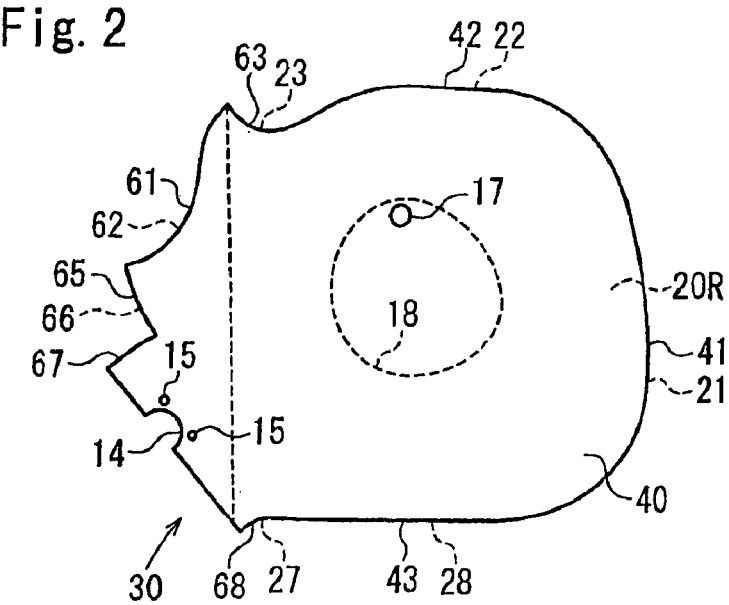
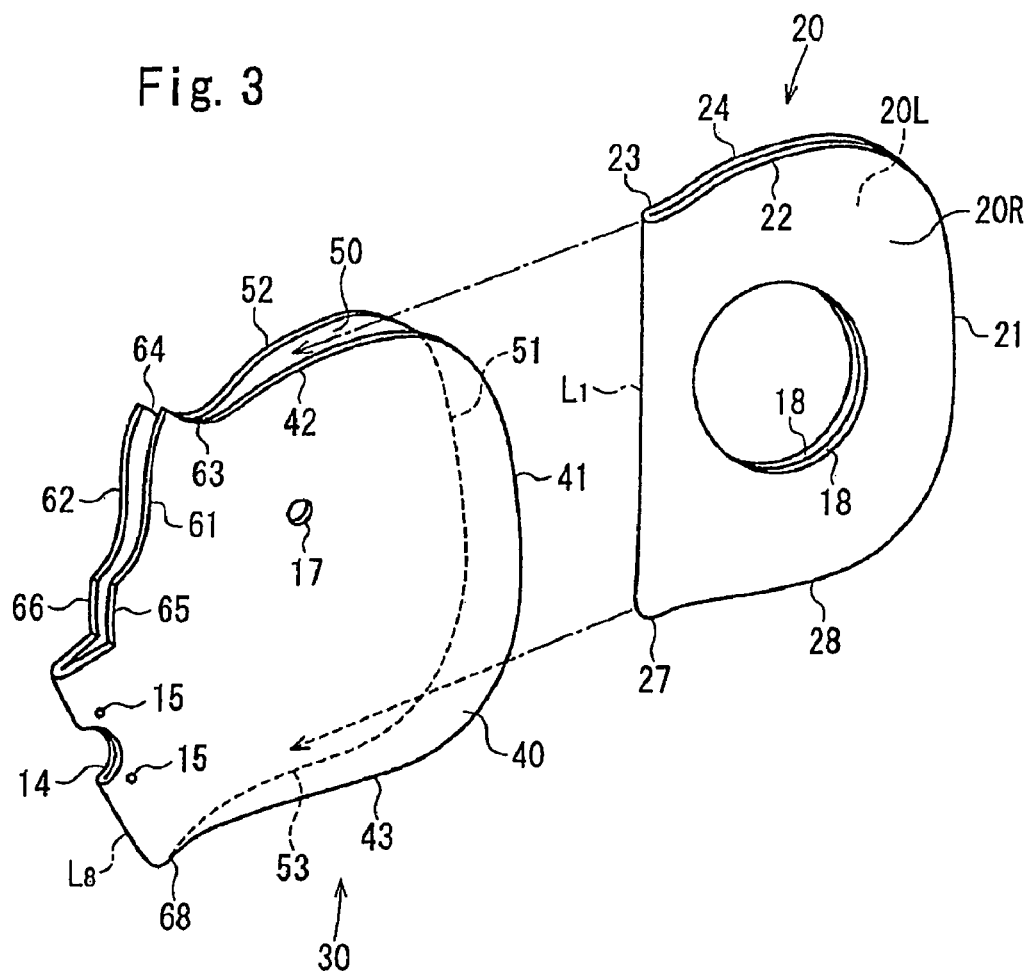

METHOD OF MANUFACTURING AIRBAG

TECHNICAL FIELD

The present invention relates to a method of manufacturing an airbag for restraining an occupant in the event of a vehicle collision or the like and particularly to a method of manufacturing an airbag having a left airbag section and a right airbag section which are inflated, respectively, on the left side and the right side in front of the occupant.

In the description below, an outside of the airbag refers to the outside of an airbag as a product, that is, a completed product, while an inside of the airbag refers to the inside of an airbag as a product, that is, a completed product.

BACKGROUND ART

As an airbag for restraining an occupant in the event of a vehicle collision or the like, an airbag having a left airbag section and a right airbag section which are inflated, respectively, on the left side and the right side in front of the occupant and configured such that they are inflated by a common inflator is described in Japanese Patent Application Publications No. 2005-145226 and No. 2004-244005. FIG. 2 of Japanese Patent Application Publication No. 2005-145226 shows a configuration in which an opening is provided in opposing faces of the left airbag section and the right airbag section, respectively, and peripheral portions of the openings of the left airbag section and the right airbag section are sewn together.

By sewing the peripheral portions of the openings on the opposing faces together in this way, a depth of a space portion opened toward the occupant generated between the left airbag section and the right airbag section becomes shallow. The depth of the space portion can be adjusted by selecting a position and size of the opening.

In FIGS. 9 and 10 in Japanese Patent Application Publications No. 2004-244005, it is described that a tether belt (suspension line) extends between a left side face of the left airbag section and a right side face of the right airbag section. In the figures, the suspension string is constituted by three suspension strings, namely, a left suspension string connecting a left side face of the left airbag section to the opposing face, a right suspension string connecting a right side face of the right airbag section to the opposing face, and a central suspension string connecting the opposing face of the left airbag section and the opposing face of the right airbag section. These three suspension strings are arranged in straight line states.

This airbag is folded and contained in a case, which is covered by a cover. If an inflator, that is, a gas generator is operated so as to expel gas in the event of a vehicle collision, the airbag pushes and opens the cover and is inflated toward the front of the occupant.

Patent Document 1: Japanese Patent Application Publication No. 2005-145226

Patent Document 2: Japanese Patent Application Publication No. 2004-244005

In the above Japanese Patent Application Publication No. 2005-145226, the airbag is constituted by four major panels, namely, right and left outside panels, an inside panel, and a base-end side panel, and many sewing processes are performed.

In the above Japanese Patent Application Publication No. 2004-244005, the tether belt is constituted by three suspension strings arranged in straight line states, and sewing and attachment of the tether belt requires labor.

DISCLOSURE OF INVENTION

A first object of the present invention is to provide a method of manufacturing an airbag with which an airbag having a left airbag section and a right airbag section and constituted by sewing peripheral edge portions of openings on opposing faces of each bag together can be manufactured more naturally.

A second object of the present invention is a second object to provide a method of manufacturing an airbag in which a tether belt can be easily sewn and attached.

A method of manufacturing an airbag according to a first mode is, a method of manufacturing an airbag which is inflated by an expelled gas of an inflator arranged on a base end side in a direction in which a distal end side is separated away from the base end side, in which a left airbag section inflated on the left side in front of an occupant, a right airbag section inflated on the right side in front of the occupant, and a base end chamber with which sides, opposite the occupant, of the left airbag section and the right airbag section communicate are provided, an opening is provided in opposing faces of the left airbag section and right airbag section, respectively, edge portions of each of the openings are sewn together, and the left airbag section and the right airbag section communicate with each other through the openings, the airbag being constituted by a single inside panel constituting the opposing faces of the left airbag section and the right airbag section and a single outside panel constituting a left side face of the left airbag section, an occupant opposite face of the airbag, and a right side face of the right airbag section sewn together, characterized in that the airbag is manufactured by an overlapping process of overlapping the inside panel and the outside panel in a double-folded state so that a portion (left-side opposing face constituting portion) constituting the opposing face of the left airbag section and a portion (right-side opposing face constituting portion) constituting the opposing face of the right airbag section in the inside panel are overlapped with each other such that airbag inner side faces thereof oppose each other, a portion (left-side face constituting portion) constituting the left side face of the left airbag section in the outside panel and the left-side opposing face constituting portion of the inside panel are overlapped with each other such that airbag outer side faces thereof oppose each other, and a portion (right-side face constituting portion) constituting the right side face of the right airbag section in the outside panel and the right-side opposing face constituting portion of the inside panel are overlapped with each other such that the airbag outer side faces thereof oppose each other, a subsequent main sewing process of sewing peripheral edge portions of a part of the peripheral edge portions of the outside panel along the base end chamber together and sewing the peripheral edge portions of the inside panel and the outside panel together, an opening peripheral edge portion sewing process, at the beginning, in the middle or after the main sewing process, of reversing the inside panel at least partially so that at least the peripheral edge portion of the opening of the left-side opposing face constituting portion and the peripheral edge portion of the opening of the right-side opposing face constituting portion in the inside panel are overlapped with each other such that the airbag outer side faces thereof oppose each other and then, of sewing the peripheral edge portions of the openings together, a reversing process of reversing the outside panel and the inside panel through an unsewn portion made up of a remaining portion along the base end chamber in the peripheral edge portion of the outside panel after that, and a sealing and sewing process of sealing the unsewn portion by sewing.

The order in which sewing the peripheral edge portions of a part of the peripheral edge portion of the outside panel along the base end chamber and the sewing of the peripheral edge portions of the inside panel and the outside panel is carried out arbitrary.

The method of manufacturing an airbag according to a second mode is characterized in that, in the first mode, a tether belt connecting the left side face of the left airbag section and the right side face of the right airbag section are provided through the opening in the airbag, the tether belt is made of a connected body of a left half tether on the left airbag section side and a right half tether on the right airbag section side, one end of the left half tether is sewn and attached to a region to oppose the opening in the airbag inner side face of the left side face constituting portion of the outside panel before the overlapping process, one end of the right half tether is sewn and attached to a region to oppose the opening in the airbag inner side face of the right side face constituting portion of the outside panel, the other end side of one of the left half tether and the right half tether is inserted through the opening after the reversing process, the other end sides of both the left half tether and the right half tether are made to extend to the outside of the airbag through the unsewn portion and the other end sides of the left half tether and the right half tether are sewn together, and then, the connected body of the left half tether and the right half tether are returned to inside of the airbag, and then, the sealing and sewing process is performed.

In the method of manufacturing an airbag in the first mode, the airbag having the left airbag section, right airbag section, and base end chamber, is manufactured by sewing two major panels, namely, the outside panel and the inside panel, and the sewing of the panels is easy and the manufacture of the airbag is easy.

According to the method of manufacturing an airbag in the second mode, the tether belt connecting the left side face of the left airbag section and the right side face of the right airbag section is constituted by the two half tethers, namely, the left half tether and the right half tether, and moreover, these half tethers are inserted through the opening of the airbag, and the sewing of the tether belts is easy, and moreover, when the airbag is inflated, the tether belt spontaneously extends from the left side face of the left airbag section to the right side face of the right airbag section in a straight line state.

BRIEF DESCRIPTION OF THE DRAWINGS

FIG. 2 is an explanatory diagram of the method of manufacturing an airbag according to the embodiment.

FIG. 3 is an explanatory diagram of the method of manufacturing an airbag according to the embodiment.

BEST MODE FOR CARRYING OUT THE INVENTION

An embodiment of the present invention will be described below referring to the attached drawings.

Figure 12:
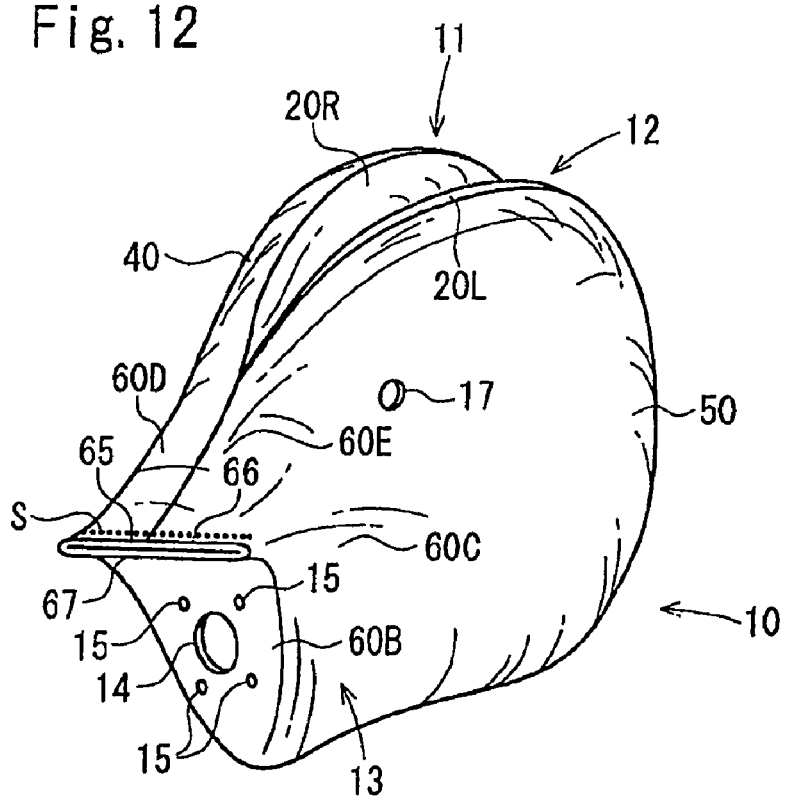
FIG. 12 is an explanatory diagram of the method of manufacturing an airbag according to the embodiment.
Figure 13:
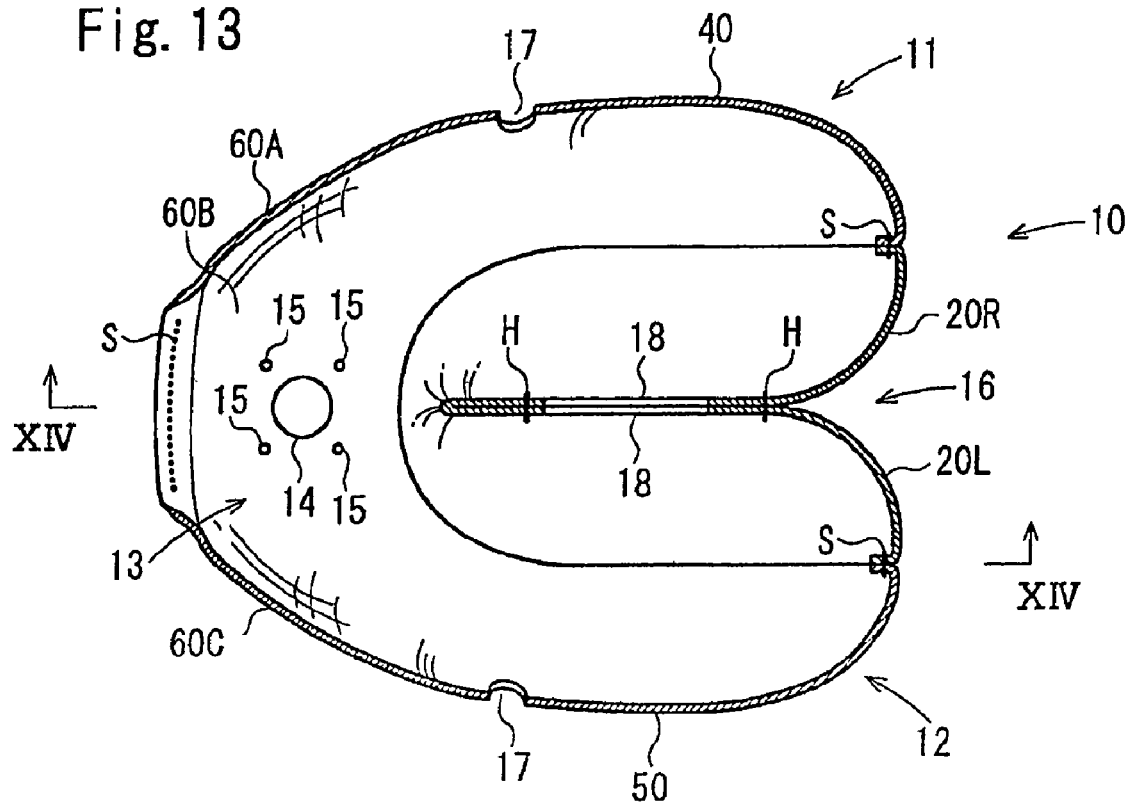
FIG. 13 is a horizontal sectional view of the airbag manufactured by the method of manufacturing the airbag illustrated in FIGS. 1*a* to 12.
Figure 14:
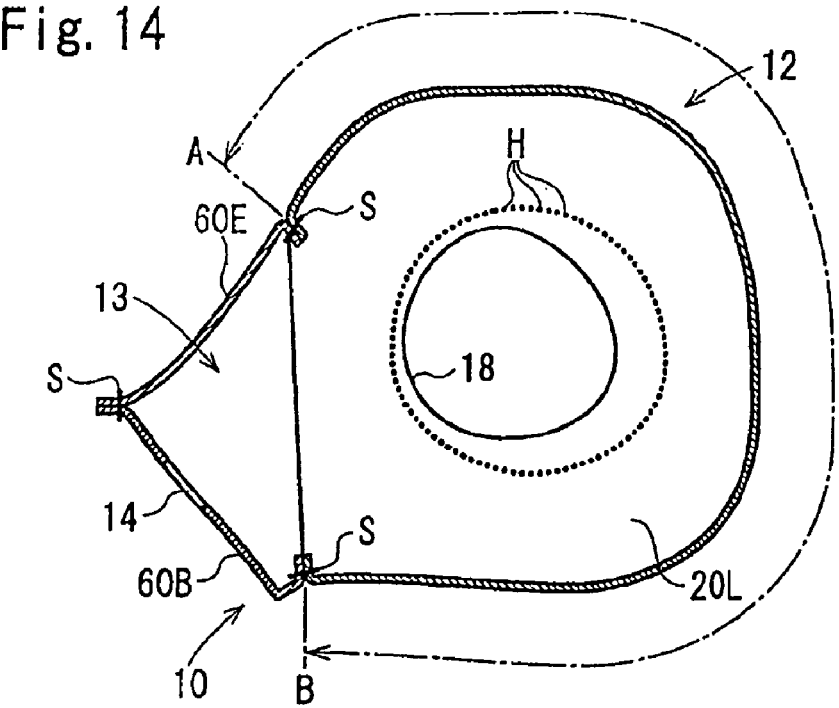
FIG. 14 is a vertical sectional view of the airbag manufactured by the method of manufacturing the airbag illustrated in FIGS. 1*a* to 12.

FIGS. 1*a* to 12 are explanatory diagrams of the method of manufacturing an airbag according to an embodiment of the present invention, FIG. 13 is a horizontal sectional view of an airbag 10 manufactured by this manufacturing method, and FIG. 14 is a vertical sectional view taken along line XIV-XIV in FIG. 13.

Figure 1A:
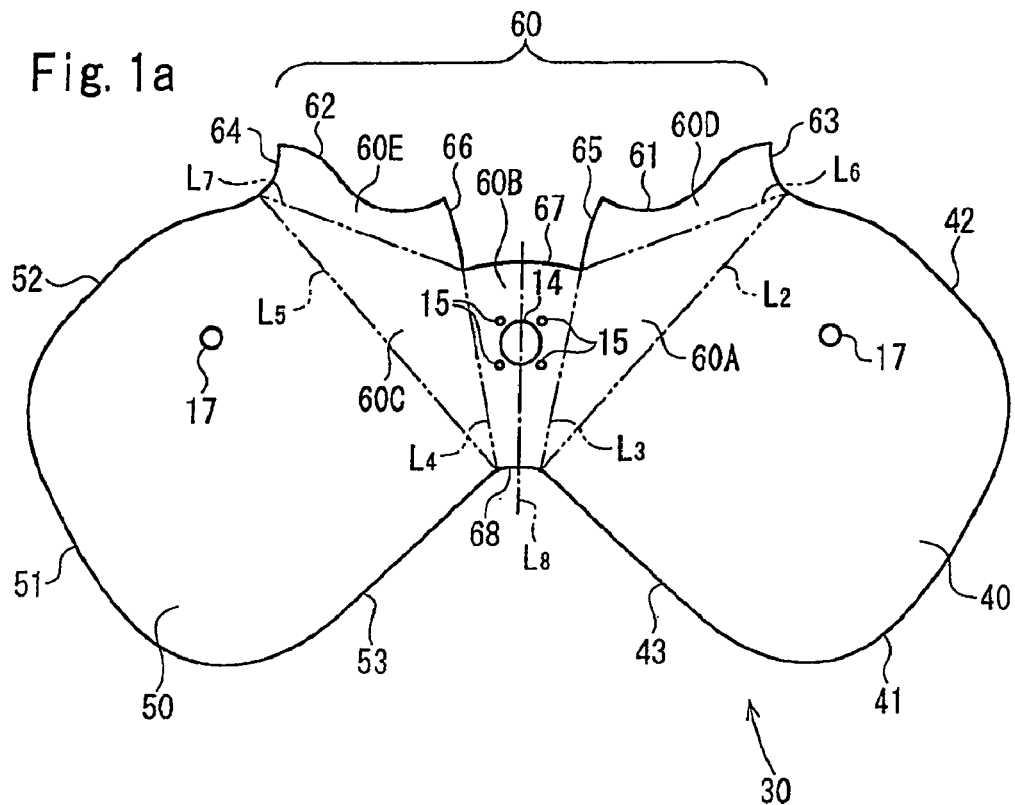
FIGS. 1*a* and 1*b* are explanatory diagrams of a method of manufacturing an airbag according to an embodiment, respectively.
Figure 1B:
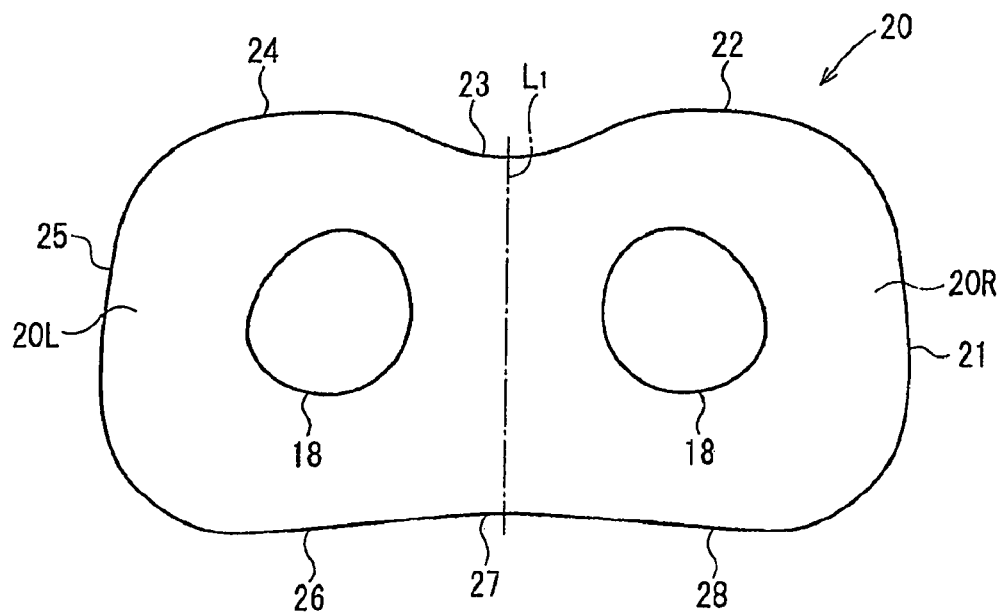

FIGS. 1*a* and 1*b* are plan views of an outside panel 30 and an inside panel 20 constituting the airbag 10, respectively.

Figure 10:
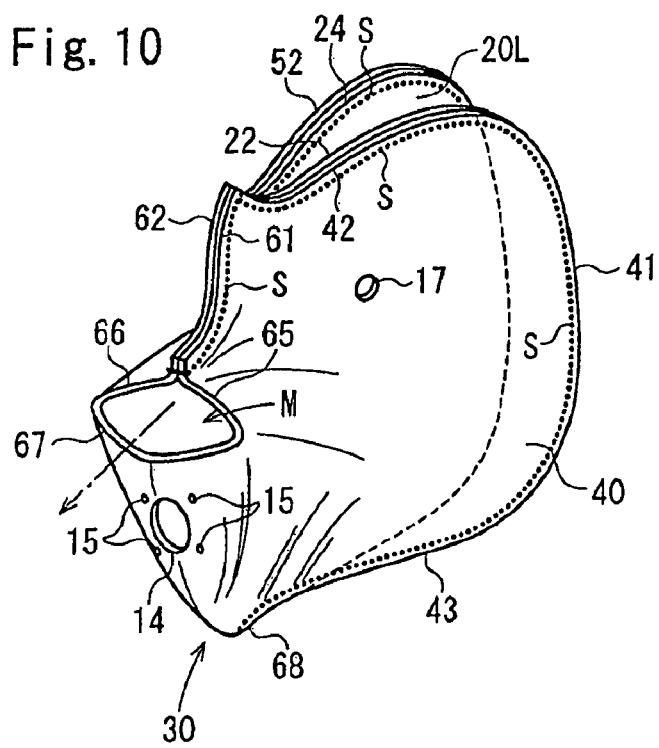
FIG. 10 is an explanatory diagram of the method of manufacturing an airbag according to the embodiment.
Figure 11:
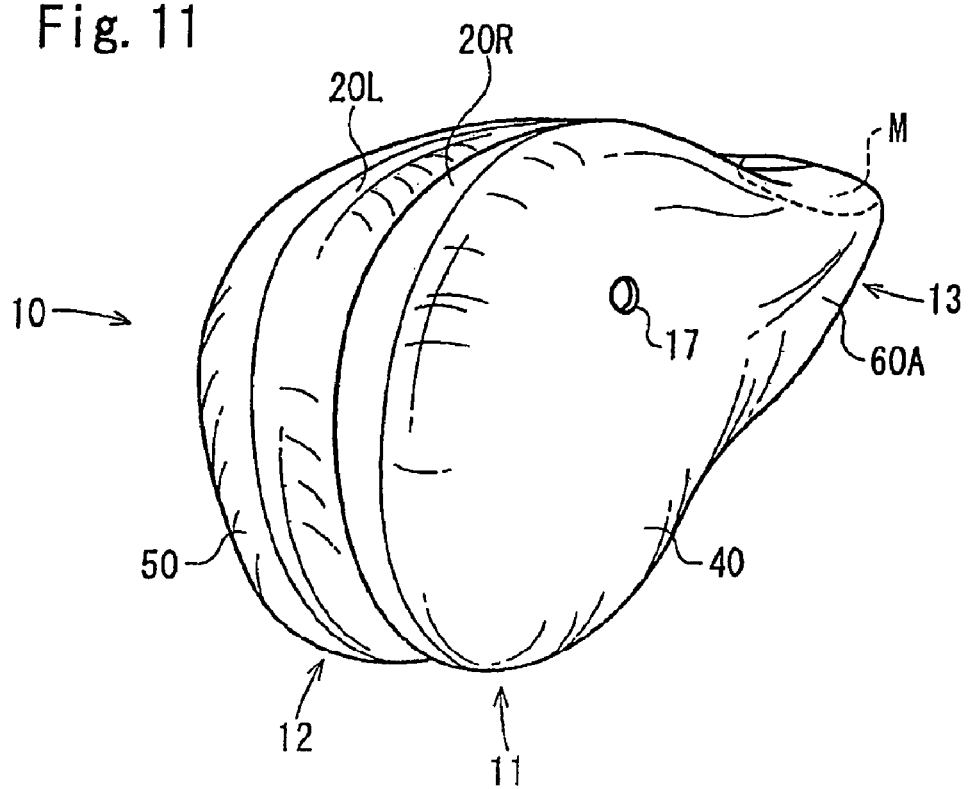
FIG. 11 is an explanatory diagram of the method of manufacturing an airbag according to the embodiment.

FIGS. 2 and 4 to 11 are plan views and perspective views of stages during manufacture of the airbag 10, and FIG. 12 is a perspective view of the airbag 10 when it is completed. FIG. 3 is an exploded perspective view of an outside panel 30 and an inside panel 20 at a stage illustrated in FIG. 2.

The airbag 10 (FIGS. 12 to 14) manufactured by the method of manufacturing an airbag of this embodiment is a passenger airbag of an automobile.

As shown in FIG. 13, the airbag 10 has a right airbag section 11 that inflates on a right side in front of an occupant, a left airbag section 12 that inflates on a left side in front of the occupant, and a base end chamber 13 with which base end sides of the right airbag section 11 and the left airbag section 12 communicate, respectively. On a bottom face of the base end chamber 13, an inflator insertion port 14 into which an inflator (not shown) is inserted is provided. On the periphery of the inflator insertion port 14, a plurality of bolt insertion holes 15 are provided through which bolts (not shown) for fixing the bottom face of the base end chamber 13 to a retainer (not shown) of an airbag device are inserted.

As shown in FIG. 13, in a state where the airbag 10 is inflated, there is no extending member such as a tie panel between distal end portions of the right airbag section 11 and the left airbag section 12, but a space portion 16 formed between the distal end portions of both the bags 11, 12 is open to the occupant, that is, to the right in FIG. 13.

In a state where the airbag 10 is completely inflated, an interval between the most distal end of the right airbag section 11 and the most distal end of the left airbag section 12 is preferably 150 to 350 mm or particularly 170 to 330 mm.

In each of the right side face of the right airbag section 11 and the left side face of the left airbag section 12, that is, a right outer face 40 and a left outer face 50 of an outside panel 30, which will be described later, a vent hole 17 is provided, respectively.

As shown in FIG. 13, in this airbag 10, in each of opposing faces of the right airbag section 11 and the left airbag section 12, that is, a right side 20R and a left side 20L of an inside panel 20, which will be described later, an opening 18 is provided. The openings 18, 18 are overlapped with each other in a substantially concentric state, and peripheral edge portions thereof are sewn together by a seam H made up of a thread or the like. The seam H extends around the openings 18, 18 in an endless ring state.

That is, in the airbag 10, the opposing faces of the right airbag section 11 and the left airbag section 12 are connected with each other through sewing of the peripheral edge portions of the openings 18, 18, and internal spaces of both the bags 11, 12 communicate with each other through the openings 18, 18.

In the present invention, as shown in FIG. 14, the seam H, in the inflated state of the airbag 10, preferably extends so as to extend around the opening 18 and be separated within a range of 30 to 200 mm from an upper end face, a distal end face, and a lower end face of the right airbag section 11 and the left airbag section 12, that is, from a face from point A to point B in FIG. 14 to the center side of the right airbag section 11 and the left airbag section 12.

Subsequently, panel configuration of the airbag 10 will be described. In the following description, a front side, that is, a distal end side of each panel refers to the distal end side in the inflation direction of the airbag 10, while a rear side refers to a base end side in the inflation direction.

This airbag 10 is constituted by two panels in total, namely, the inside panel 20 and the outside panel 30.

As shown in FIG. 1b, the inside panel 20 is an elongated panel substantially having a calabash shape, and by being double-folded at a folding line $L_1$ at the center in the lateral direction, the right side 20R as the right-side opposing face constituting portion and the left side 20L as the left-side opposing face constituting portion are formed. In the inside panel 20, the right side 20R constitutes the opposing face of the right airbag section 11 with the left airbag section 12, while the left side 20L constitutes the opposing face of the left airbag section 12 with the right airbag section 11. Also, the vicinity of the folding line $L_1$ of the inside panel 20 constitutes the deepest portion in a valley between the right airbag section 11 and the left airbag section 12.

Side portions of the entire periphery of the inside panel 20 are constituted by a lower side 28, a distal-end side 21, an upper side 22, an upper side 23 in the vicinity of the folding line $L_1$ of the right side 20R, an upper side 24, a distal-end side 25, a lower side 26, and a lower side 27 in the vicinity of the folding line $L_1$ of the left side 20L.

In the right side 20R and the left side 20L, the openings 18 are provided, respectively.

As shown in FIG. 1a, the outside panel 30 has the right outer face 40 as the right side face constituting portion constituting the right side face of the right airbag section 11, the left outer face 50 as the left side face constituting portion constituting the left side face of the left airbag section 12, and a base end face 60 constituting a face surrounding the base end chamber 13.

The right outer face 40 and the left outer face 50 have side edges on the outer periphery constituted by the distal-end sides 41, 51, upper sides 42, 52, and lower sides 43, 53. In the right outer face 40 and the left outer face 50, the vent holes 17 are provided, respectively.

The base end face 60 has a right side face 60A, a bottom face 60B, a left side face 60C, a right flap 60D constituting an upper-face right side, and a left flap 60E constituting an upper-face left side. The base end side of the right outer face 40 continues to the right side face 60A, while the base end side of the left outer face 50 continues to the left side face 60C.

A two-dot chain line $L_2$ in FIG. 1a indicates a boundary between the right outer face 40 and the right side face 60A, a two-dot chain line $L_3$ indicates a boundary between the right side face 60A and the bottom face 60B, a two-dot chain line $L_4$ indicates a boundary between the bottom face 60B and the left side face 60C, a two-dot chain line $L_5$ indicates a boundary between the left side face 60C and the left outer face 50, a two-dot chain line $L_6$ indicates a boundary between the right side face 60A and the right flap 60D, and a two-dot chain line $L_7$ indicates a boundary between the left side face 60C and the left flap 60E.

The base end face 60 has its outer edge constituted by opposite sides 61, 62 of the flaps 60D, 60E, front sides of the flaps 60D, 60E, that is, flap front sides 63, 64, rear sides of the flaps 60D, 60E, that is, flap rear sides 65, 66, a rear side of the bottom face 60B opposite the rear sides 65, 66, that is, bottom-portion rear side 67, and a front side of the bottom face 60B, that is, a bottom-portion front side 68.

The flap front sides 63, 64 continue to the upper sides 42, 52 of the right outer face 40 and the left outer face 50, respectively, while both end sides of the bottom-portion front side 68 continue to lower sides 44, 54 of the right outer face 40 and the left outer face 50, respectively.

Subsequently, the method of manufacturing the airbag 10 will be described. In the following description, the outside refers to an outside of the airbag 10 as a product, that is, a completed product, while the inside refers to an inside of the airbag 10 as a product, that is, a completed product.

First, airbag outer side faces of the inside panel 20 and the outside panel 30, that is, outer side faces of the airbag 10 as a completed product are made to oppose each other, and the inside panel 20 and the outside panel 30 are overlapped with each other in an extended state.

Then, airbag inner side faces of the right side 20R of the inside panel 20 and the left side 20L of the inside panel 20, that is, the inner side faces of the airbag 10 as a completed product are made to oppose each other, and the inside panel 20 and the outside panel 30 are folded twice along the folding lines $L_1$ (FIG. 1b), $L_8$ (FIG. 1a) at the center of the horizontal direction of each. FIG. 2 shows a state after the inside panel 20 and the outside panel 30 have been folded twice as above. Also, FIG. 3 is an exploded perspective view illustrating the inside panel 20 and the outside panel 30 separately at this stage shown in FIG. 2.

It may be so constituted that the inside panel 20 and the outside panel 30 are folded twice separately and then, the inside panel 20 in the double-folded state is sandwiched between the right outer face 40 and the left outer face 50 of the outside panel 30 so as to have the state shown in FIG. 2.

At this time, the distal-end sides 21, 41, upper sides 22, 42, and lower sides 28, 43 of the right side 20R and the right outer face 40 are overlapped, respectively, and the distal-end sides 25, 51, upper sides, 24, 52, and lower sides 26, 53 of the left side 20L and the left outer face 50 are overlapped, respectively. Also, the upper side 23 in the vicinity of the folding line $L_1$ of the inside panel 20 overlaps the flap front sides 63, 64 of the right flap 60D and the left-flap 60E, and the lower side 23 in the vicinity of the folding line $L_1$ of the inside panel 20 overlaps the bottom-portion front side 68 of the bottom face 60B. Moreover, the opposite sides 61, 62, flap front sides 63, 64, and flap rear sides 65, 66 of the right flap 60D and the left flap 60E are overlapped, respectively.

Figure 4:
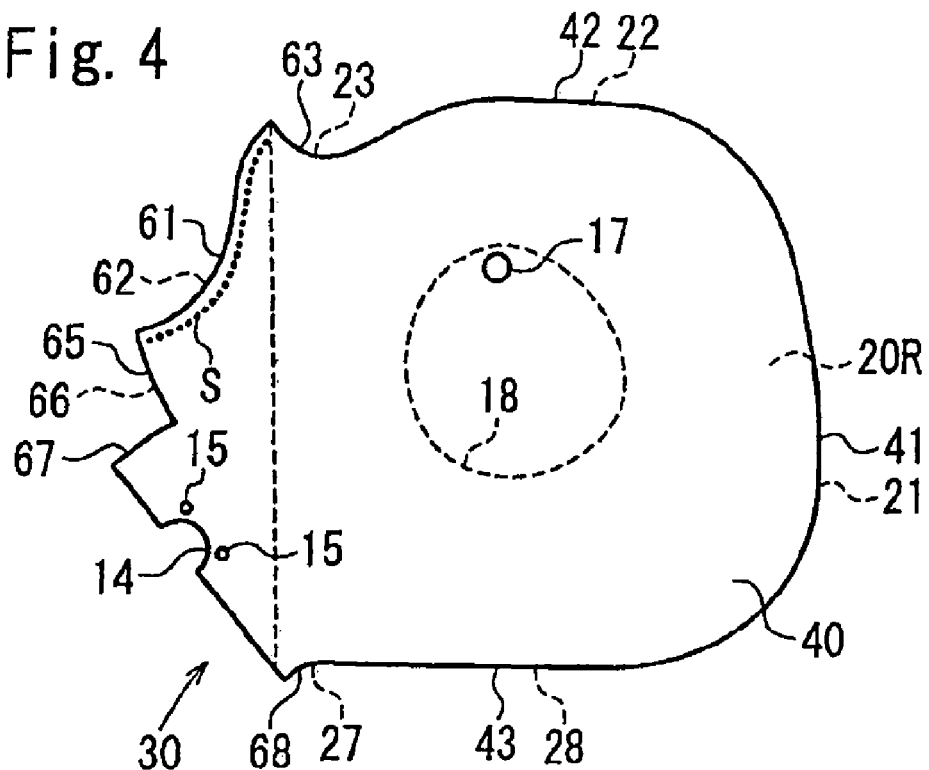
FIG. 4 is an explanatory diagram of the method of manufacturing an airbag according to the embodiment.

Subsequently, as shown in FIG. 4, the overlapped opposite sides 61, 62 of the right flap 60D and the left flap 60E are sewn together. Reference character S denotes a seam to be sewn.

Figure 5:
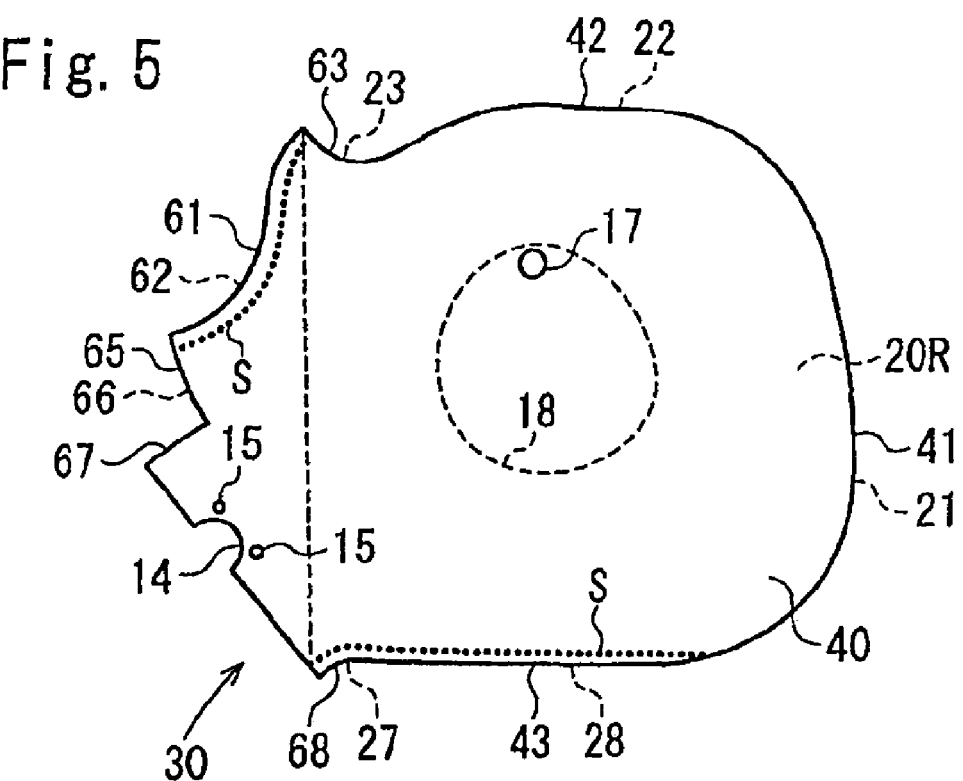
FIG. 5 is an explanatory diagram of the method of manufacturing an airbag according to the embodiment.

Then, as shown in FIG. 5, lower edge portions of the inside panel 20 and the outside panel 30, that is, the lower sides 28, 43 of the right side 20R and the right outer face 40, the lower side 27 in the vicinity of the folding line $L_1$ of the inside panel 20 and the bottom-portion front side 68 of the bottom face 60B, and the lower sides 26, 53 of the left side 20L and the left outer face 50 are continuously sewn together.

Figure 6:
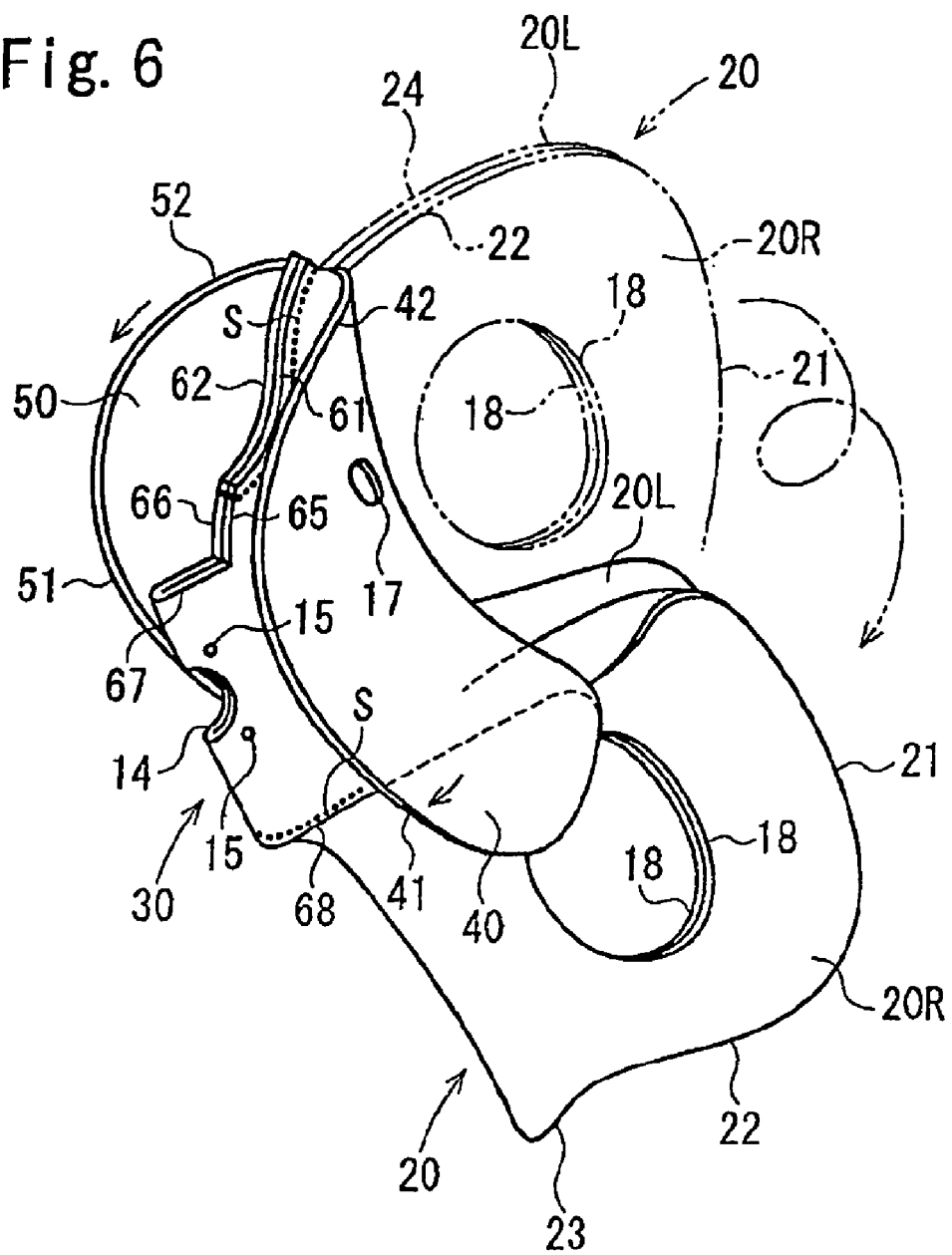
FIG. 6 is an explanatory diagram of the method of manufacturing an airbag according to the embodiment.
Figure 7:
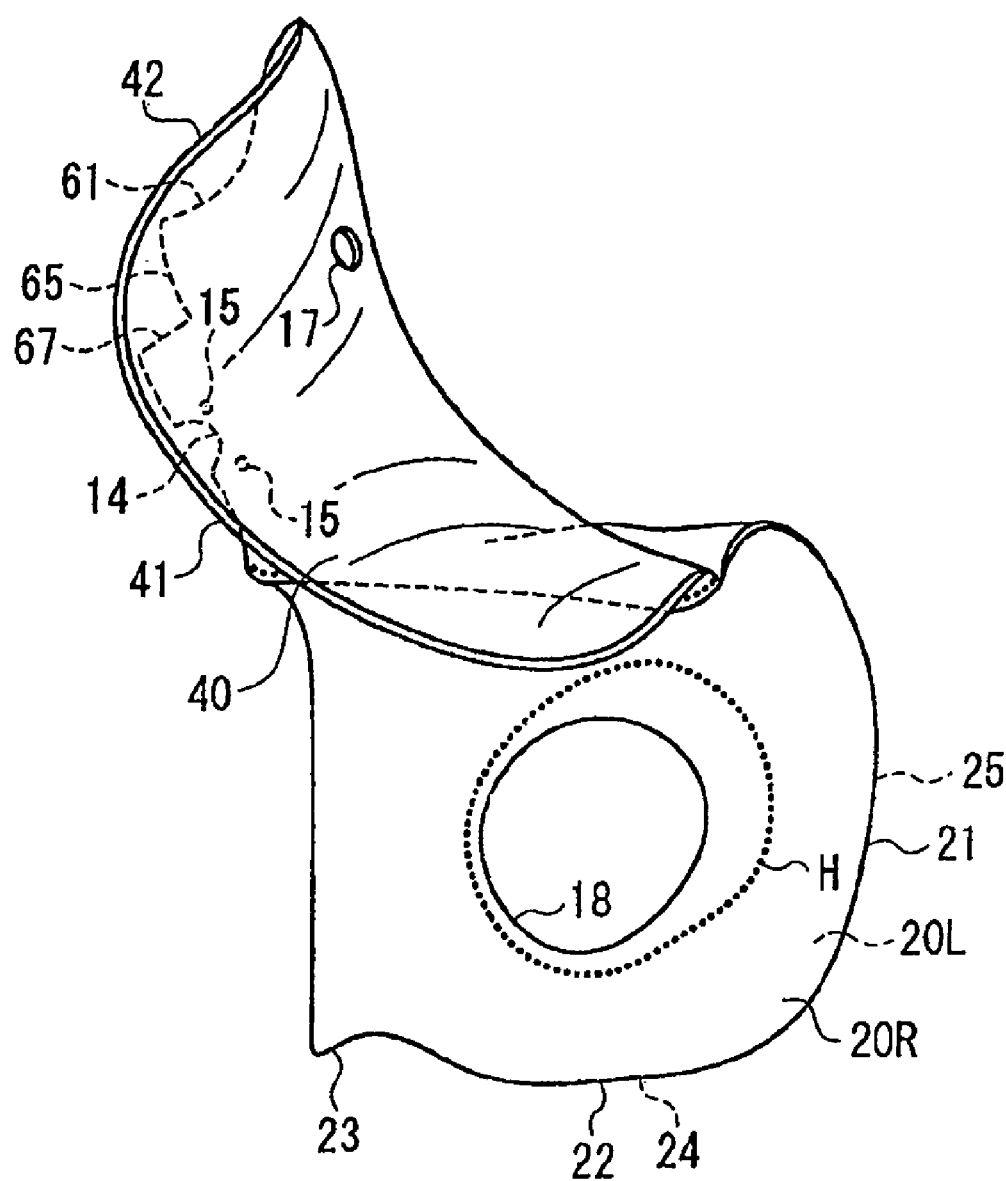
FIG. 7 is an explanatory diagram of the method of manufacturing an airbag according to the embodiment.

Subsequently, as shown in FIG. 6, the right outer face 40 and the left outer face 50 are tucked up toward the base end side of the outside panel 30, respectively, so as to expose the inside panel 20, and the inside panel 20 is reversed so that the right side 20R and the left side 20L are overlapped such that the respective airbag side face sides are made to oppose each other. Then, as shown in FIG. 7, the peripheral edge portions of the openings 18, 18 of the right side 20R and the left side 20L are sewn together over the entire periphery by the seam H.

In this embodiment, the inside panel 20 is entirely reversed, but since it is only necessary that at least the peripheral edge portion of the opening 18 of the right side 20R and the peripheral edge portion of the opening 18 of the left side 20L are overlapped such that the respective airbag outer side faces are made to oppose each other, the region including at least the peripheral edge portions of the openings 18, 18 in the inside panel 20 may be partially reversed.

Figure 8:
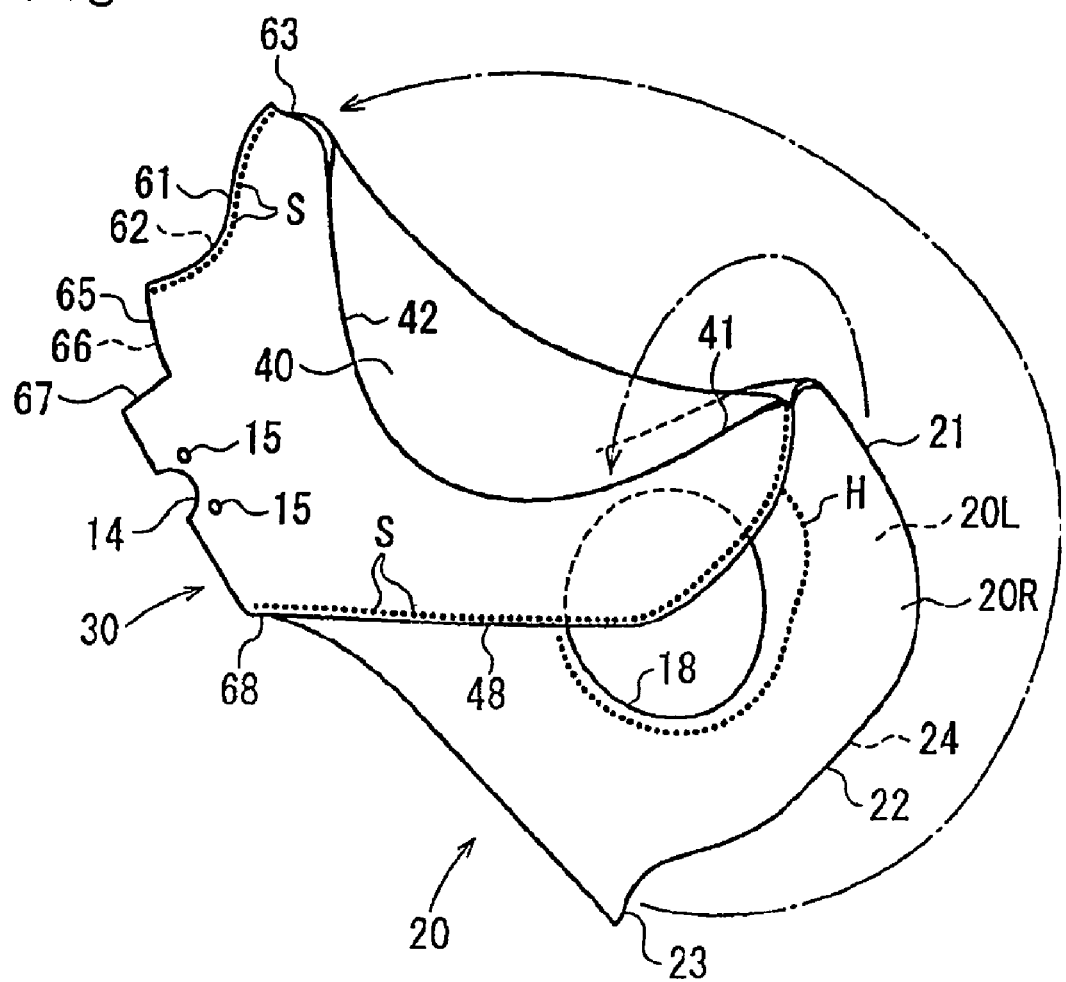
FIG. 8 is an explanatory diagram of the method of manufacturing an airbag according to the embodiment.

After that, as shown in FIG. 8, the inside panel 20 and the outside panel 30 are overlapped again so that the airbag outer side faces of the right outer face 40 and the right side 20R are made to oppose each other and the airbag outer side faces of the left outer face 50 and the left side 20L are made to oppose each other.

Then the remaining peripheral edge portions of the inside panel 20 and the outside panel 30, that is, the distal end sides 21, 41 and the upper sides 22, 42 of the right side 20R and the right outer face 40, the upper side 23 in the vicinity of the folding line $L_1$ of the inside panel 20, the flap front sides 63, 64 of the right flap 60D and the left flap 60E, the distal end sides 25, 51 and the upper sides 24, 52 of the left side 20L and the left outer face 50 are continuously sewn together. Both the ends of this sewing continue to the sewn portion between the lower sides 28, 43 of the right side 20R and the right outer face 40 and the sewn portion between the lower sides 26, 53 of the left side 20L and the left outer face 50, respectively.

Figure 9:
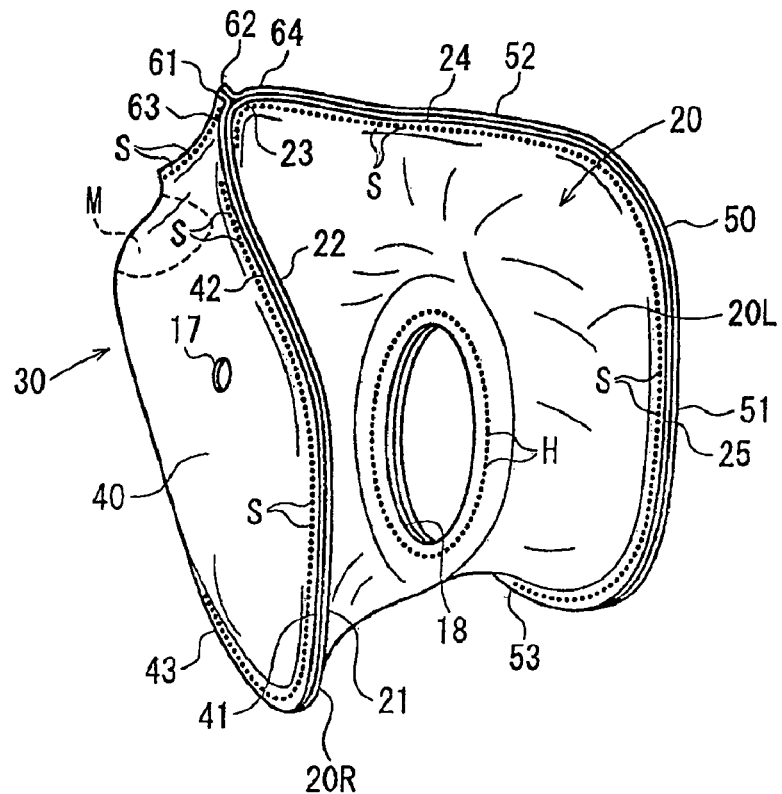
FIG. 9 is an explanatory diagram of the method of manufacturing an airbag according to the embodiment.

FIG. 9 shows a state in which the sewing between the peripheral edge portions of the inside panel 20 and the outside panel 30 is finished. By means of the sewing, a state in which the airbag 10 (FIG. 13) is reversed is constituted.

As shown in FIG. 10, at this stage, the flap rear sides 65, 66 and the bottom-face rear side 67 of the base end face 60 has not been sewn yet, and this unsewn portion makes an opening port M.

Then, the airbag 10 is reversed inside out through the opening port M. FIG. 11 shows a state in which the airbag 10 has been reversed inside out. Then, as shown in FIG. 12, the flap rear sides 65, 66 and the bottom-face rear side 67 are sewn together and the opening port M is sealed so that the airbag 10 is completed.

As mentioned above, in the method of manufacturing the airbag 10, since the airbag 10 having the right airbag section 11, the left airbag section 12, and the base end chamber 13 is constituted by two panels, namely, the inside panel 20 and the outside panel 30, labor of sewing the panels is small, and the airbag 10 can be manufactured easily.

In this embodiment, the opposite sides 61, 62 of the right flap 60D and the left flap 60E are sewn together and then, the lower edge portions of the inside panel 20 and the outside panel 30 are sewn together, and then, the peripheral edge portions of the openings 18, 18 of the right side 20R and the left side 20L are sewn together, and then, the remaining peripheral edge portions of the inside panel 20 and the outside panel 30 are sewn together, but the order in which the individual parts are sewn is not limited to the above.

For example, in the present invention, before the opposite sides 61, 62 of the right flap 60D and the left flap 60E are sewn together or before the lower edge portions of the inside panel 20 and the outside panel 30 are sewn together, the peripheral edge portions of the openings 18, 18 of the right side 20R and the left side 20L may be sewn together.

Alternatively, it may be so configured that after the peripheral edge portions of the inside panel 20 and the outside panel 30 are sewn over the entire periphery, the center of the inside panel 20 is pulled out from the vicinity thereof, the peripheral edge portion of the opening 18 of the right side 20R and the peripheral edge portion of the opening 18 of the left side 20L are overlapped so that the respective airbag outer side faces are made to oppose each other and then, the peripheral edge portions of the openings 18, 18 are sewn together.

The order in which the opposite sides 61, 62 of the right flap 60D and the left flap 60E as well as the peripheral edge portions of the inside panel 20 and the outside panel 30 are sewn is also arbitrary. The order in which the lower sides of the inside panel 20 and the outside panel 30, the distal end sides, and the upper sides are sewn is also arbitrary.

This airbag 10 is attached to an airbag device for passenger for restraining a passenger in an automobile in the event of a vehicle collision.

Though not shown, the airbag 10 is contained in a case or a container in a folded state. An inflator is inserted into the inflator insertion port 14 on the bottom face 60B of the base end chamber 13, and the bottom face 60B is fixed into the case through the bolt insertion hole 15. By attaching a lid onto the case so as to cover the folded body of the airbag 10, the airbag device is constituted. The lid is torn open by a pressing force from the airbag 10 when the airbag 10 is inflated.

This airbag device is installed on an upper face of an instrument panel in front of the passenger seat of an automobile.

An operation of the airbag device is as follows.

When an automobile in which the airbag device is mounted is involved in a collision, the inflator is operated to expel a gas. By means of the gas from the inflator, the base end chamber 13 is inflated and then, since the gas flows into the right airbag section 11 and the left airbag section 12 from the base end chamber 13, the right airbag section 11 and the left airbag section 12 are inflated and extended to the occupant side, respectively.

In this airbag 10, since the right airbag section 11 and the left airbag section 12 communicate with each other through the openings 18, 18 provided in opposing faces thereof, the gas reciprocally moves between the right airbag section 11 and the left airbag section 12 through the openings 18, 18 during the inflation. Thus, even if more gas flows into one of the right airbag section 11 and the left airbag section 12 from the base end side 13, the gas also flows into the other airbag through the openings 18, 18, and the internal pressures of the right airbag section 11 and the left airbag section 12 are made substantially equal, and the right airbag section 11 and the left airbag section 12 are inflated substantially equally.

Also, since the middle portions in the inflation directions of the right airbag section 11 and the left airbag section 12 are connected by sewing the peripheral edge portions of the openings 18, 18, even if one of the right airbag section 11 and the left airbag section 12 should start inflating prior to the other airbag, the prior inflating airbag pulls the delayed inflating airbag in the inflation direction and promotes its inflation so that the both are inflated substantially equally.

In the state in which the inflation of the airbag 10 is completed, the space portion 16 in the valley state is formed between the distal end portions of the right airbag section 11 and the left airbag section 12, and the space portion 16 is opened toward the occupant. Furthermore, the inflated right airbag section 11 receives the right side of the chest of the occupant, while the inflated left airbag section 12 receives the left side of the chest, and the space portion 16 is opposed to the vicinity of the breast bone. Thus, when the inflated airbag receives the occupant, a reaction force applied to the vicinity of the breast bone of the occupant from the airbag is made small.

In this embodiment, as mentioned above, the seam H, with which the peripheral edge portions of the openings 18, 18 are sewn together, in the state in which the airbag 10 is inflated, extends so as to extend the periphery of the opening 18 and be separated within a range of 30 to 200 mm from the upper end face, distal end face, and lower end face of the right airbag section 11 and the left airbag section 12, that is, from a face from A point to B point in FIG. 14 to the center side of the right airbag section 11 and the left airbag section 12. Therefore, when the inflated airbag 10 receives the occupant, the occupant is prevented from excessively deeply entering between the right airbag section 11 and the left airbag section 12.

Figure 27:
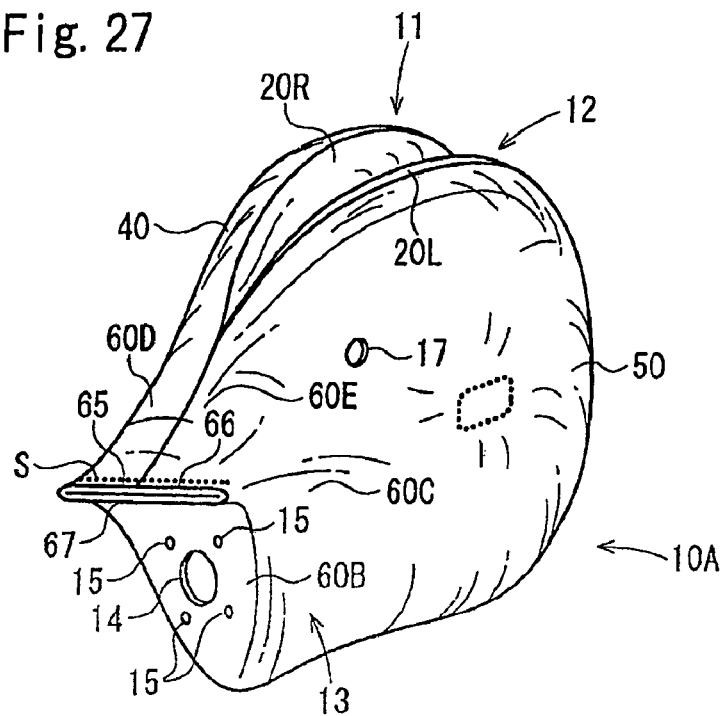
FIG. 27 is an explanatory diagram of the method of manufacturing an airbag according to the embodiment.
Figure 28:
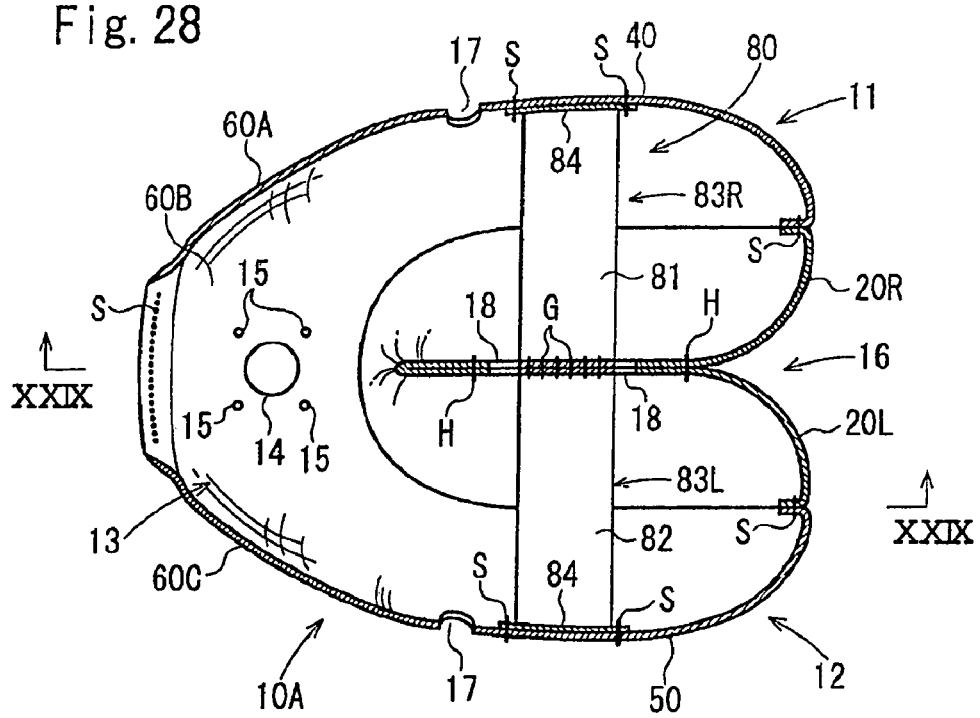
FIG. 28 is a horizontal sectional view of the airbag manufactured by the method of manufacturing the airbag in FIGS. 15 to 27.
Figure 29:
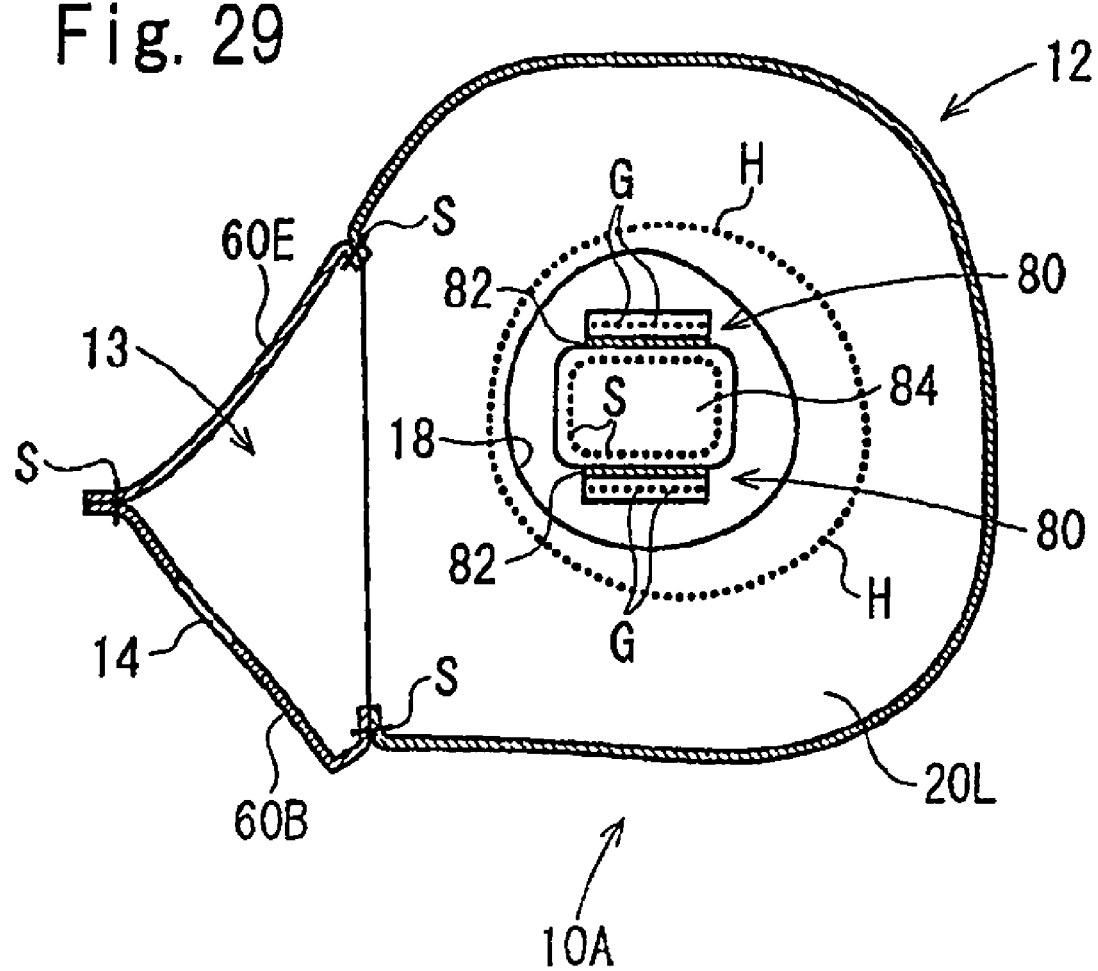
FIG. 29 is a vertical sectional view of the airbag manufactured by the method of manufacturing the airbag in FIGS. 15 to 27.
Figure 30:
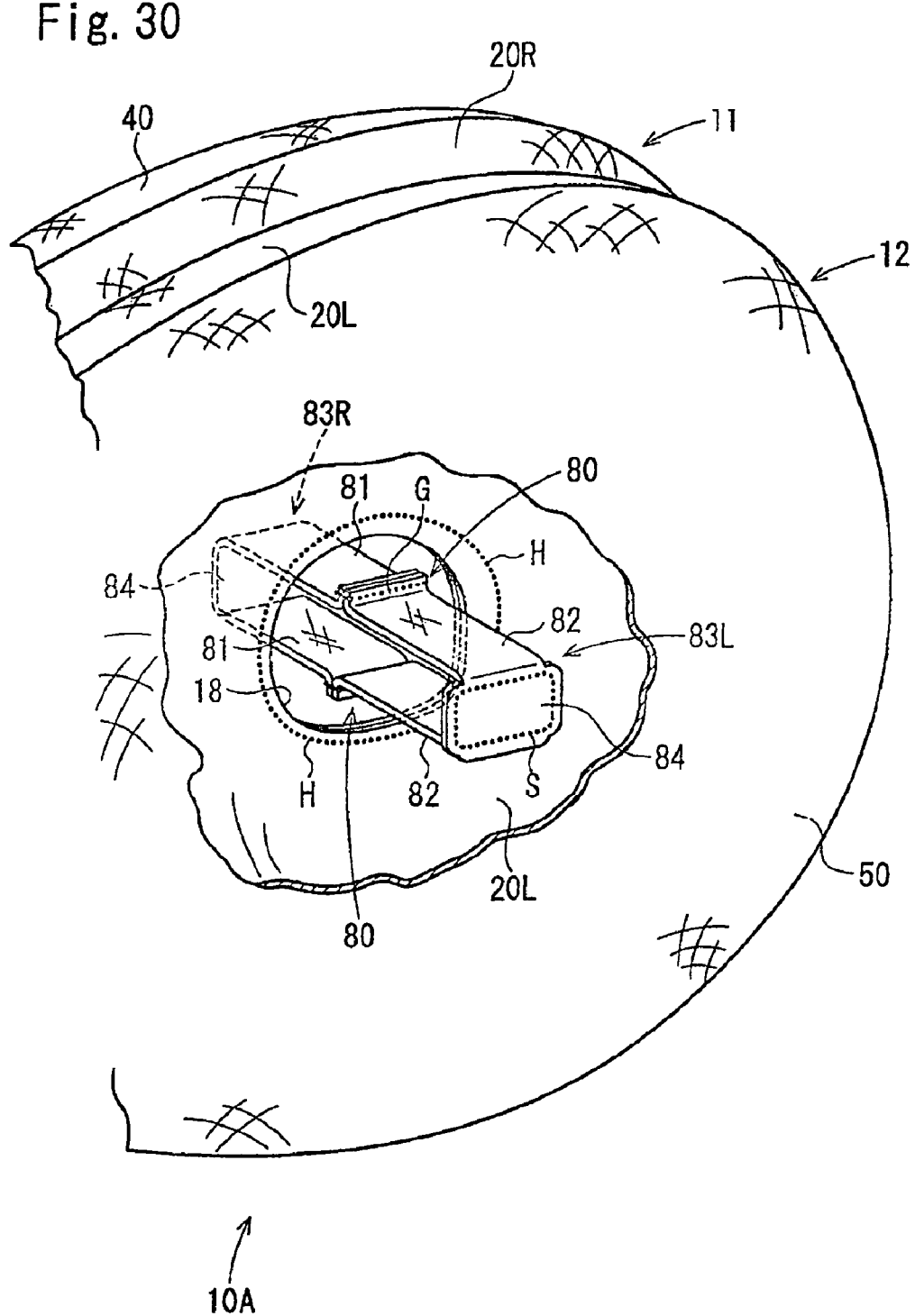
FIG. 30 is a transparent perspective view of an inside of the airbag manufactured by the method of manufacturing the airbag in FIGS. 15 to 27.

FIGS. 15 to 27 are explanatory diagrams of the method of manufacturing an airbag according to another embodiment, FIG. 28 is a horizontal sectional diagram of an airbag 10A manufactured by this manufacturing method, FIG. 29 is a vertical sectional diagram taken along XIX-XIX line in FIG. 28, and FIG. 30 is a partially transparent perspective view of the inside of the airbag 10A.

Figure 15:
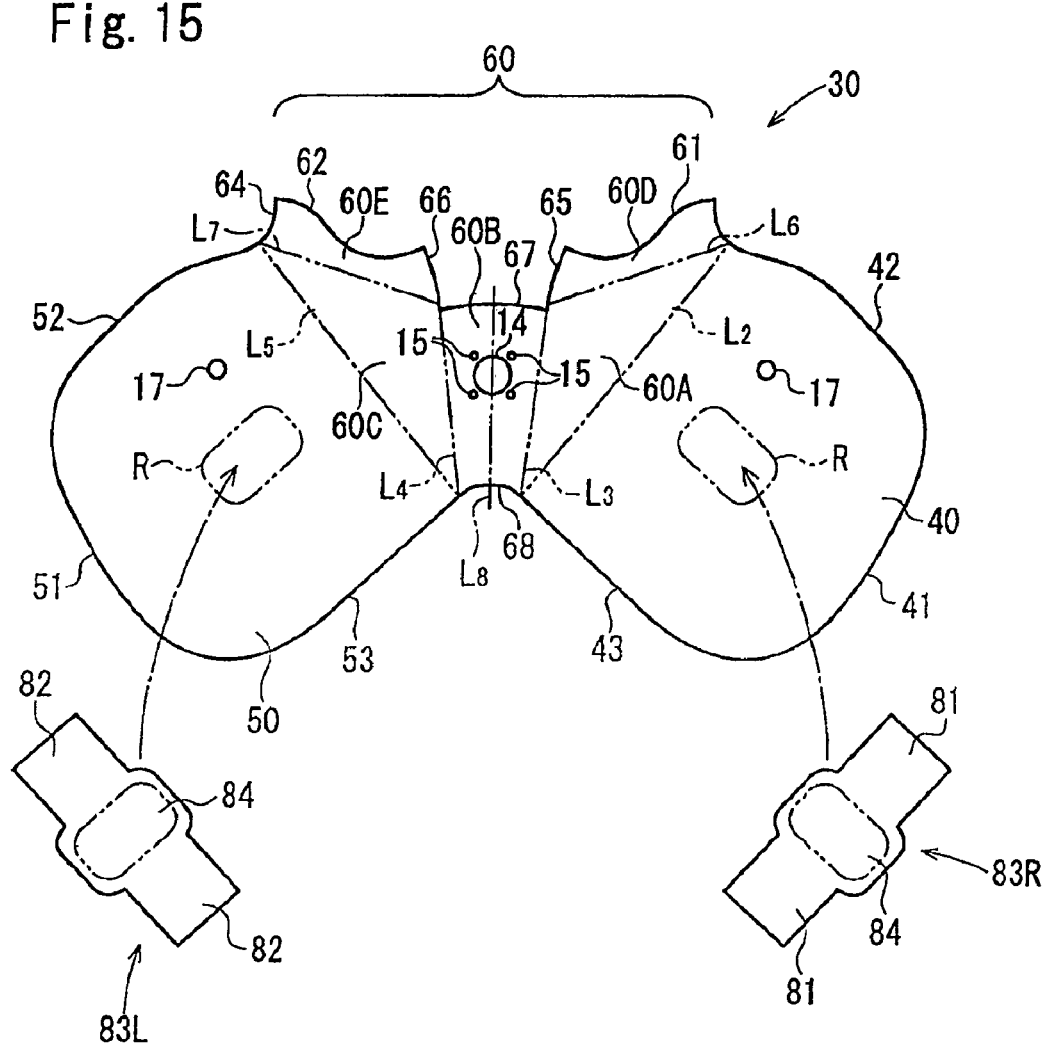
FIG. 15 is an explanatory diagram of the method of manufacturing an airbag according to the embodiment.
Figure 25:
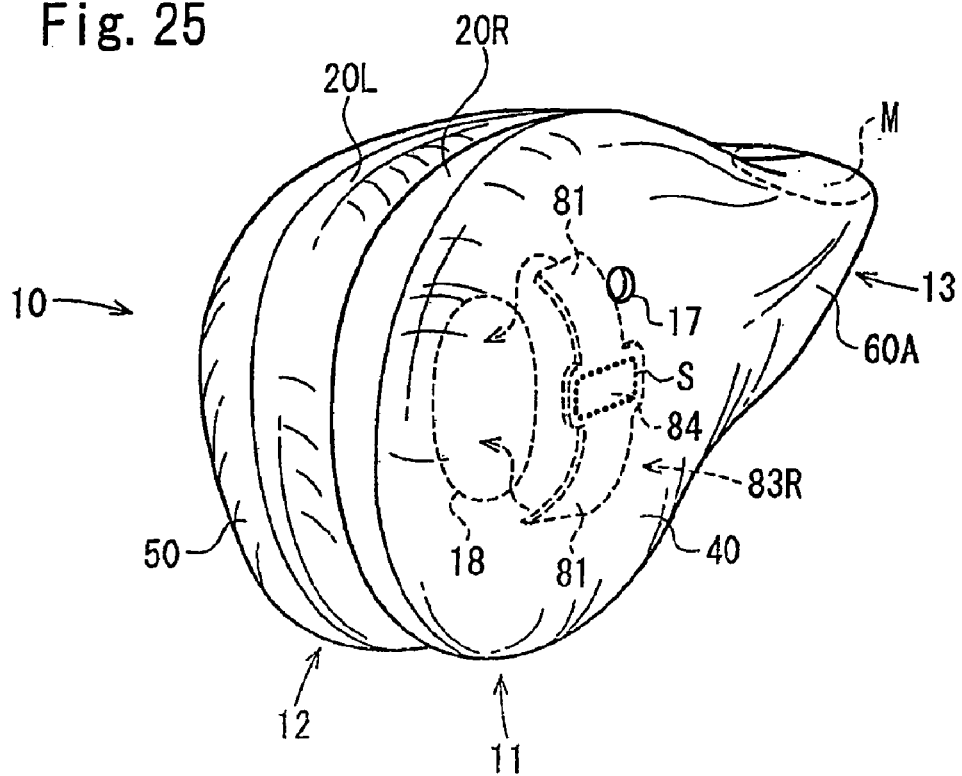
FIG. 25 is an explanatory diagram of the method of manufacturing an airbag according to the embodiment.
Figure 26:
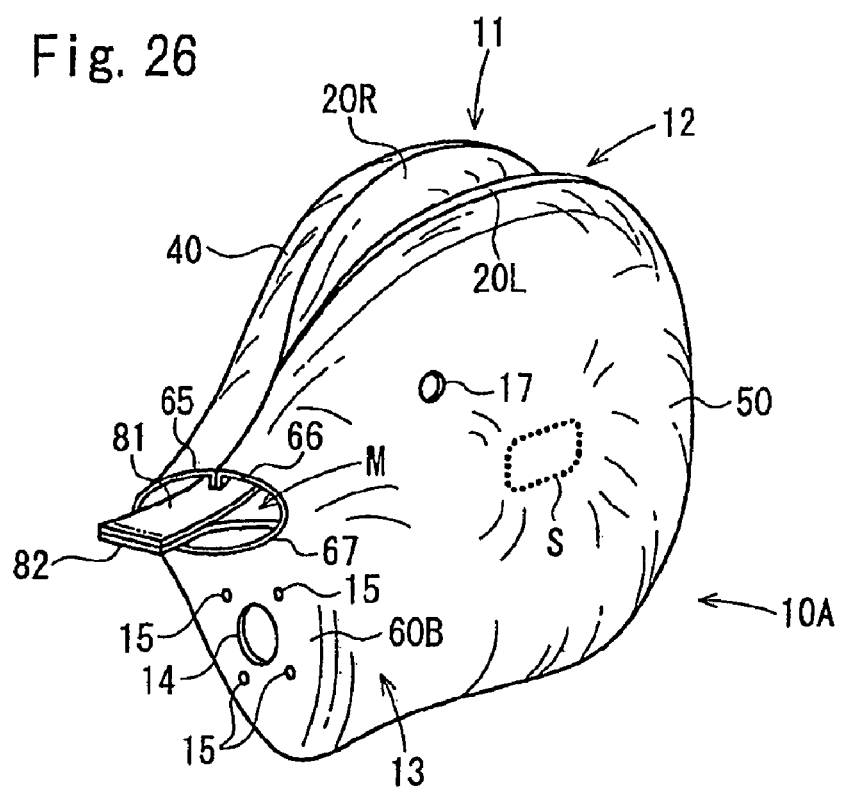
FIG. 26 is an explanatory diagram of the method of manufacturing an airbag according to the embodiment.

FIG. 15 is an exploded view (plan view) of the outside panel 30 constituting the airbag 10A, a right half tether constitution panel 83R, and a left half tether constitution panel 83L. FIGS. 16, 18 to 26 are plan views and perspective views of stages during the manufacture of the airbag 10A, and FIG. 27 is a perspective view of the airbag 10A when the airbag 10A is completed. FIG. 17 is a partial perspective view of the outside panel 30 and the inside panel 20 at a stage shown in FIG. 16.

The airbag 10A manufactured by the method of manufacturing airbag of this embodiment (FIGS. 27 to 30) is also an airbag for a passenger of an automobile.

As shown in FIG. 28, the airbag 10A has, in the airbag 10 in the above-mentioned embodiment, a constitution in which a tether belt 80 is provided connecting the right side face of the right airbag section 11, that is, the right outer face 40 of the outside panel 30 and the left side face of the left airbag section 11, that is, the left outer face 50 of the outside panel 30 through the opening 18 through which the right airbag section 11 and the left airbag section 12 communicate with each other and the insides of the airbags 11, 12. As shown in FIGS. 29, 30, in this embodiment, the right side face of the right airbag section 11 and the left side face of the left airbag section 12 are connected by two tether belts 80, 80. These tether belts 80, 80 are disposed in parallel at positions vertically different from each other.

In this embodiment, as shown in FIG. 28, each tether belt 80 is constituted by sewing together the other ends of a right half tether 81 having one end connected to the right outer face 40 of the outside panel 30 and a left half tether 82 having one end connected to the left outer face 50 of the outside panel 30.

Panel constitution of the airbag 10A is as follows.

In this airbag 10A, the right airbag section 11, the left airbag section 12, and the base end chamber 13 are also constituted by two panels, namely, the inside panel 20 and the outside panel 30.

The constitutions of the inside panel 20 and the outside panel 30 are similar to those of the airbag 10 in the above-mentioned embodiment.

As shown in FIG. 15, in this embodiment, the right half tether 81 of the upper-side tether belt 80 and the right half tether 81 of the lower-side tether 80 are constituted integrally by a single panel, that is, the right half tether constitution panel 83R. That is, the right half tether constitution panel 83R has a base piece portion 84 to be sewn to the right outer face 40 of the outside panel 30, and the right half tether 81 extends from both the upper end and the lower end of the base piece portion 84.

Also, the left half tether 82 of the upper-side tether 80 and the left half tether 81 of the lower-side tether 80 are constituted integrally by a single panel, that is, the left half tether constitution panel 83L. That is, the left half tether constitution panel 83L also has the base piece portion 84 to be sewn to the left outer face 50 of the outside panel 30, and the left half tether 82 extends from both the upper end and the lower end of the base piece portion 84.

The other configurations of the airbag 10A are the same as those of the airbag 10 in the above-mentioned embodiment. In FIGS. 15 to 30, the same reference numerals denote the same portions in FIGS. 1a to 14.

Subsequently, the method of manufacturing the airbag 10A will be described.

First, within the airbag inner side face of the right outer face 40 of the outside panel 30, that is, in the inner side face of the airbag 10A as the completed product, the base piece portion 84 of the right half tether constitution panel 83R is sewn to a region R (FIG. 15) opposing the opening 18 of the right side 20R of the inside panel 20 in the state where the airbag 10A is completed. Also, within the airbag inner side face of the left outer face 50 of the outside panel 30, the base piece portion 84 of the left half tether constitution panel 83L is sewn to the region R opposing the opening 18 of the left side 20L of the inside panel 20 in the state where the airbag 10A is completed.

Subsequently, the outside panel 30 and the inside panel 20 are overlapped so that the outer side faces of each airbag, that is, the outer side faces of the airbag 10A as the completed product are made to oppose each other. Furthermore, the inside panel 20 and the outside panel 30 are folded into two along the folding lines $L_1$ (FIG. 17), $L_8$ (FIGS. 15, 17) in the center in the lateral direction in each so that the airbag inner side faces of the right side 20R and the left side 20L of the inside panel 20 are made to oppose each other.

Figure 16:
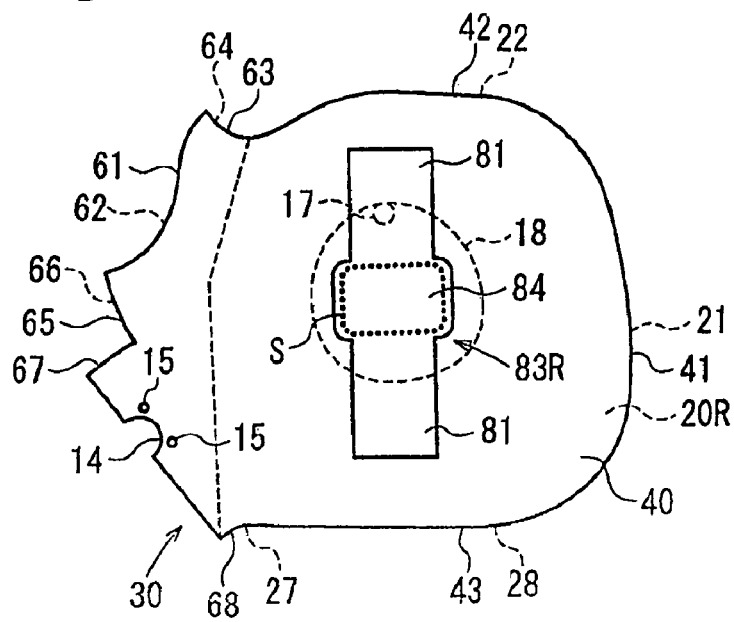
FIG. 16 is an explanatory diagram of the method of manufacturing an airbag according to the embodiment.
Figure 17:
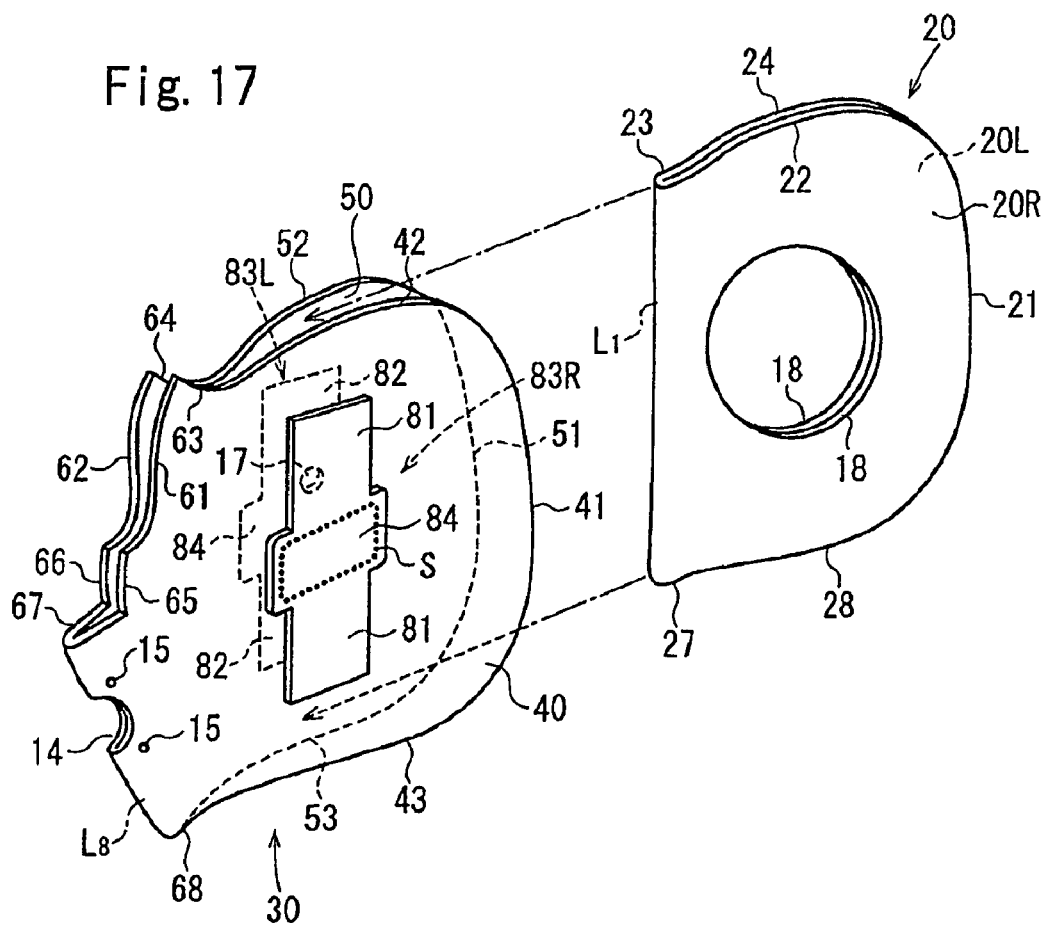
FIG. 17 is an explanatory diagram of the method of manufacturing an airbag according to the embodiment.

FIG. 16 shows a state after the inside panel 20 and the outside panel 30 have been folded into two as above. FIG. 17 is an exploded perspective view illustrating the inside panel 20 and the outside panel 30 at the stage shown in FIG. 16 separately.

In this embodiment, too, a configuration may be adopted in which the inside panel 20 and the outside panel 30 are folded into two individually and then, the inside panel 20 in the double-folded state is sandwiched between the right outer face 40 and the left outer face 50 of the outside panel 30 to have the state shown in FIG. 16.

Figure 18:
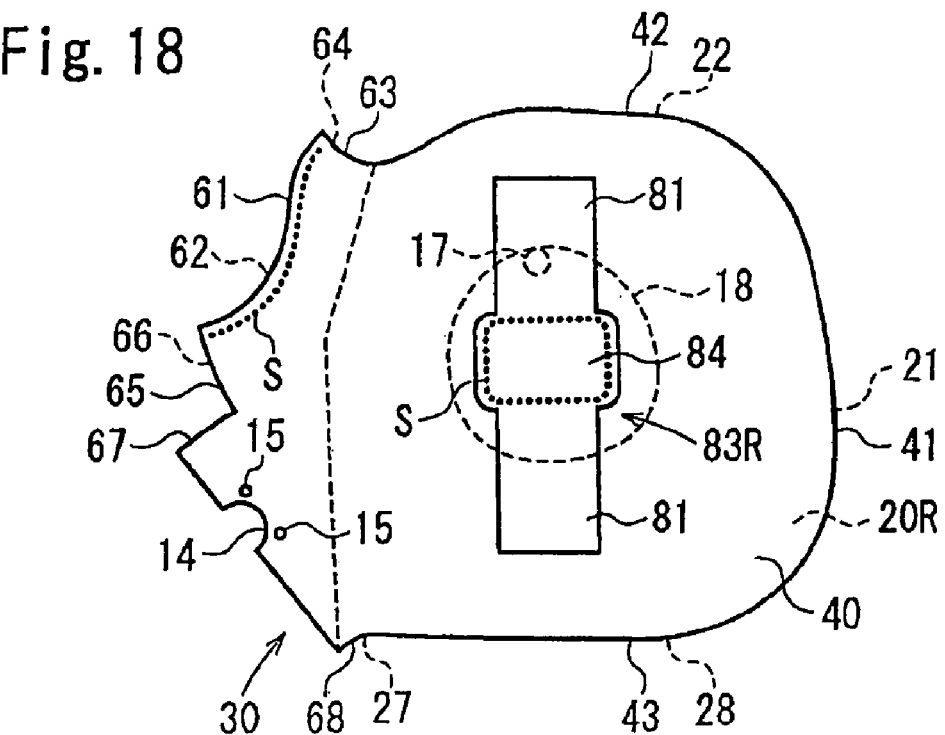
FIG. 18 is an explanatory diagram of the method of manufacturing an airbag according to the embodiment.

Subsequently, as shown in FIG. 18, the opposite sides 61, 62 of the right flap 60D and the left flap 60E overlapped in this state are sewn together.

Figure 19:
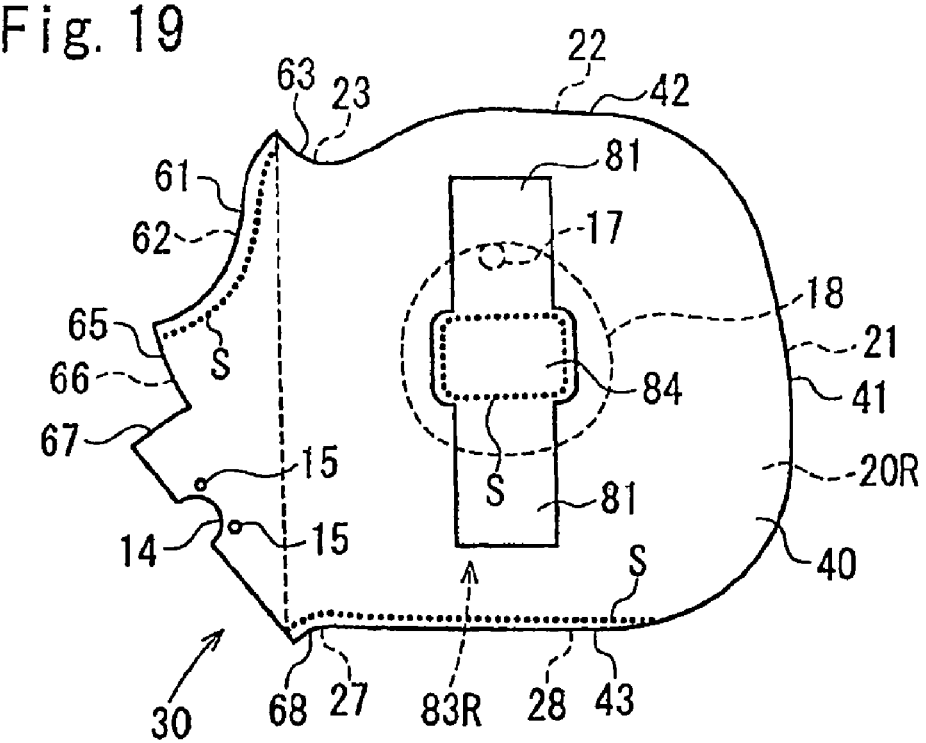
FIG. 19 is an explanatory diagram of the method of manufacturing an airbag according to the embodiment.

Subsequently, as shown in FIG. 19, the lower edge portions of the inside panel 20 and the outside panel 30, that is, the lower sides 28, 43 of the right side 20R and the right outer face 40, the lower side 27 in the vicinity of the folding line $L_1$ of the inside panel 20 and the bottom-portion front side 68 of the bottom face 60B, and the lower sides 26, 53 of the left side 20L and the left outer face 50 are continuously sewn together.

Figure 20:
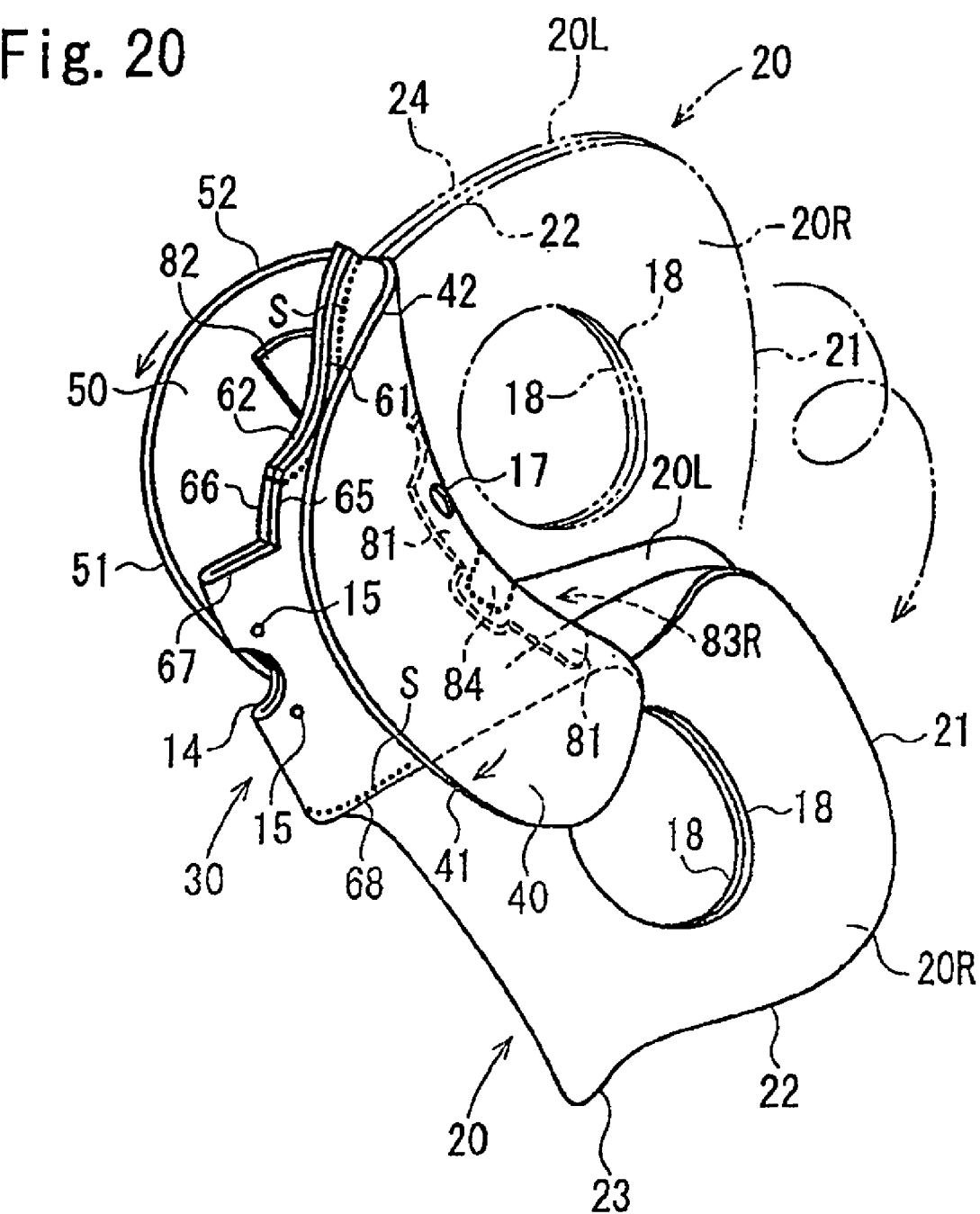
FIG. 20 is an explanatory diagram of the method of manufacturing an airbag according to the embodiment.
Figure 21:
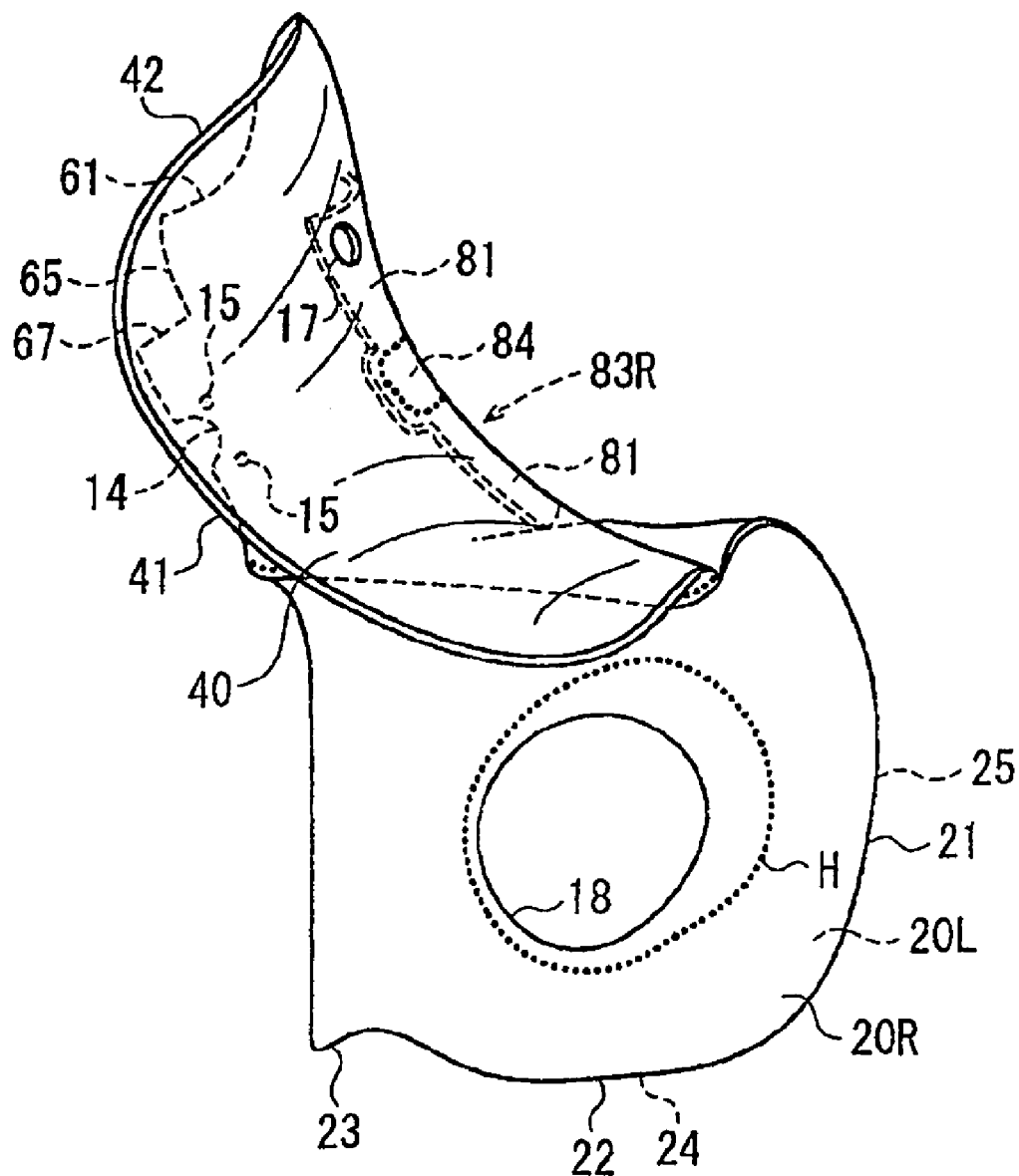
FIG. 21 is an explanatory diagram of the method of manufacturing an airbag according to the embodiment.
Figure 22:
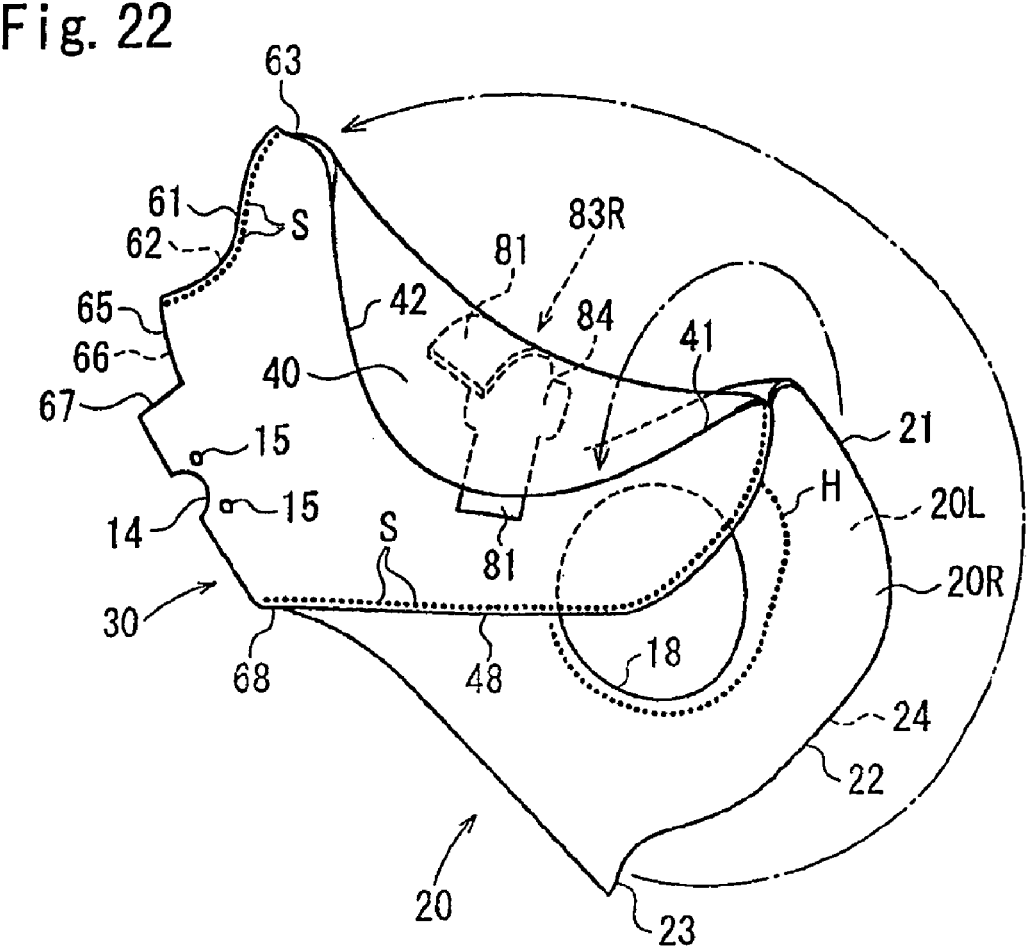
FIG. 22 is an explanatory diagram of the method of manufacturing an airbag according to the embodiment.

Subsequently, as shown in FIG. 20, the right outer face 40 and the left outer face 50 are tucked up, respectively, toward the base end side of the outside panel 30 so as to expose the inside panel 20, and the inside panel 20 is reversed so that the right side 20R and the left side 20L are overlapped with the respective airbag outer side faces opposing each other. Then, as shown in FIG. 21, the peripheral edge portions of the openings 18, 18 of the right side 20R and the left side 20L are sewn together by the seam H over the entire periphery.

In this embodiment, too, though the inside panel 20 is entirely reversed, it is only necessary that at least the peripheral edge portion of the opening 18 of the right side 20R and the peripheral edge portion of the opening 18 of the left side 20L are overlapped with the respective airbag outer side faces opposing each other as mentioned above, it may be so configured that a region including at least the peripheral edge portions of the openings 18, 18 in the inside panel 20 is partially reversed.

After that, the inside panel 20 and the outside panel 30 are overlapped again so that the airbag outer side faces of the right outer face 40 and the right side 20R are opposed to each other and the airbag outer side faces of the left outer face 50 and the left side 20L are made to oppose each other.

Then, the remaining peripheral edge portions of the inside panel 20 and the outside panel 30, that is, the distal end sides 21, 41 and the upper sides 22, 42 of the right side 20R and the right outer face 40, the upper side 23 in the vicinity of the folding line $L_1$ of the inside panel 20 and the flap front sides 63, 64 of the right flap 60D and the left flap 60E, and the distal end sides 25, 51 and the upper sides 24, 52 of the left side 20L and the left outer face 50 are continuously sewn together. Both the ends of this sewing continue to the sewn portion between the lower sides 28, 43 of the right side 20R and the right outer face 40 and the sewn portion between the lower sides 26, 53 of the left side 20L and the left outer face 50, respectively.

Figure 23:
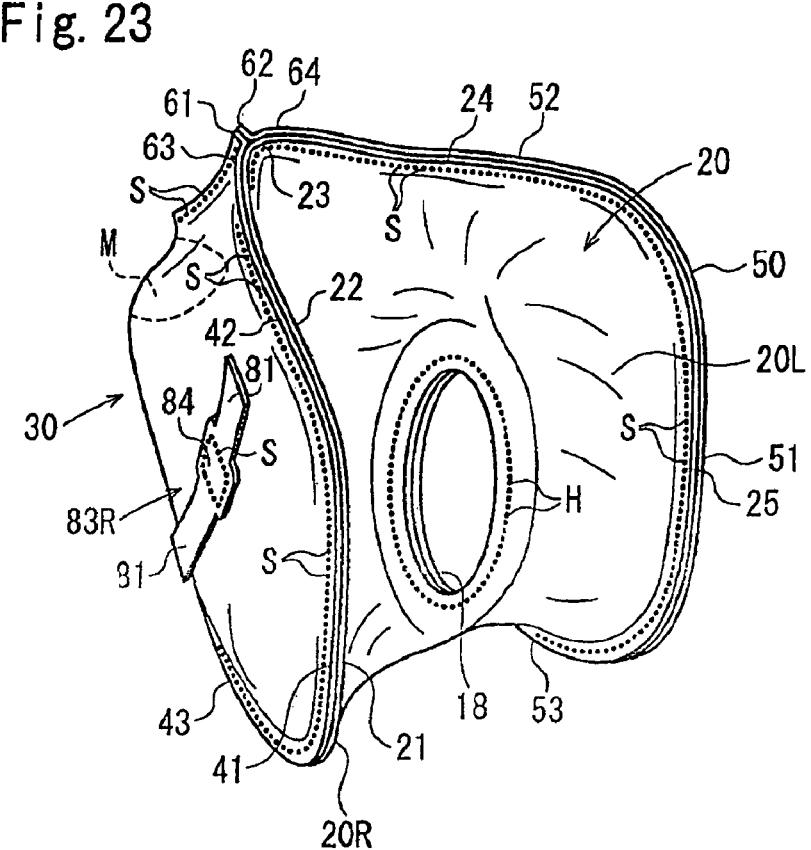
FIG. 23 is an explanatory diagram of the method of manufacturing an airbag according to the embodiment.

FIG. 23 shows a state in which the sewing between the peripheral edge portions of the inside panel 20 and the outside panel 30 is finished. By means of the sewing, the airbag 10A (FIG. 27) in the inside-out reversed state is constituted.

Figure 24:
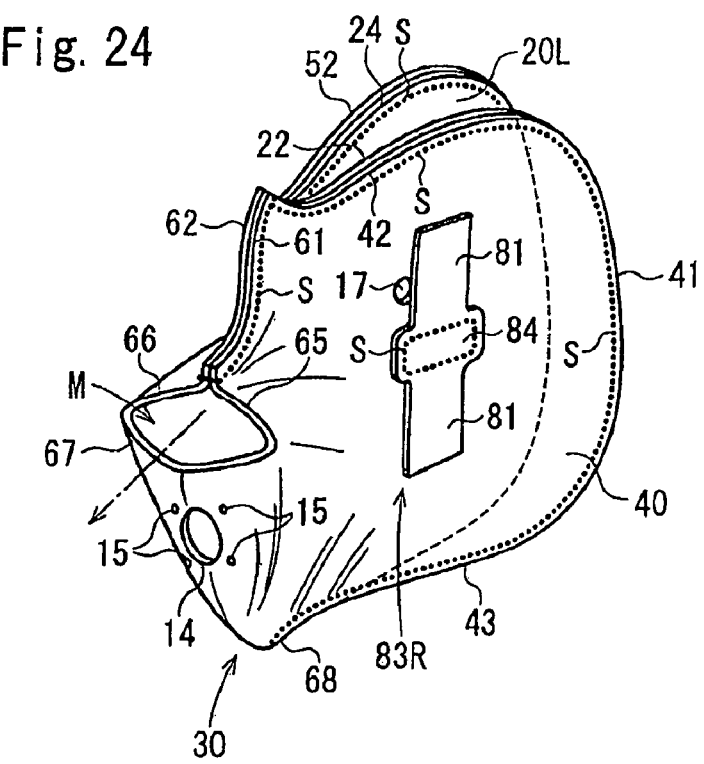
FIG. 24 is an explanatory diagram of the method of manufacturing an airbag according to the embodiment.

As shown in FIG. 24, at this stage, the flap rear sides 65, 66 of the base end face 60 and the bottom-face rear side 67 are not sewn yet, and this unsewn portion is the opening port M.

Then, the airbag 10A is reversed inside out through the opening port M. FIG. 25 shows a state after the airbag 10A has been reversed inside out.

A process from overlapping the outside panel 30 and the inside panel 20 in the double-folded state (FIG. 16) to reversing the outside panel 30 and the inside panel 20 through the opening port M made up of the unsewn portion on the rear end side of the outside panel 30 (FIG. 25) in the above is the same as the process from FIG. 2 to FIG. 11 in the method of manufacturing the airbag 10 in the above-described embodiment. That is, FIGS. 16 to 25 correspond to FIGS. 2 to 11, respectively.

Subsequently, as shown in FIG. 25, each right half tether 81 of the right half tether constitution panel 83R is inserted through the opening 18, and the distal end side of each right half tether 81 is moved into the left airbag section 12. Then, as shown in FIG. 26, the distal end sides of the upper-side right half tether 81 and left half tether 82 of both the half tether constitution panels 83R, 83L are pulled out of the left airbag section 12, that is, to outside the airbag 10A through the opening port M, respectively, and the distal end portions are sewn together by a seam G (FIG. 28), while the distal end sides of the lower-side right half tether 81 and left half tether 82 of both the half tether constitution panels 83R, 83L are pulled out of the left airbag side 12, that is, to outside of the airbag 10A through the opening port M, respectively, and the distal end portions are sewn together by the seam G.

Alternatively, in contrast, each left half tether 82 of the left half tether constitution panel 83L is inserted through the opening 18, and the distal end side of each left half tether 82 is moved into the right airbag section 12. Then, the distal end sides of the upper-side right half tether 81 and left half tether 82 of both the half tether constitution panels 83R, 83L are pulled out of the right airbag section 11, that is to outside of the airbag 10A through the opening port M, respectively, and the distal end portions are sewn together by the seam G, while the distal end sides of the lower-side right half tether 81 and left half tether 82 of both the half tether constitution panels 83R, 83L are pulled out of the right airbag section 11, that is, to outside of the airbag 10A through the opening port M, respectively, and the distal end portions are sewn together by the seam G.

As a result, the upper-side right half tether 81 and left half tether 82 of both the half tether constitution panels 83R, 83L are connected, the lower-side right half tether 81 and left half tether 82 are connected, and upper and lower two tether belts 80 connecting the right side face of the right airbag section 11 and the left side face of the left airbag section 12 through the opening 18 and the insides of the right airbag section 11 and the left airbag section 12 is constituted.

After that, each tether belt 80 is returned into the airbag 10A, and as shown in FIG. 27, the flap rear sides 65, 66 and the bottom-portion rear side 67 are sewn together and the opening port M is sealed so as to complete the airbag 10A.

As mentioned above, in the method of manufacturing the airbag 10A, each tether belt 80 connecting the right side face of the right airbag section 11, that is, the right outer face 40 of the outside panel 30 and the left side face of the left airbag section 12, that is, the left outer face 50 of the outside panel 30 is constituted by two half tethers of the right half tether 81 and the left half tether 82. Moreover, the half tethers 81, 82 are inserted through the opening 18 connecting the right airbag section 11 and the left airbag section 12.

Therefore, the sewing of each tether belt 80 is easy and moreover, when the airbag 10A is inflated, each tether belt 80 spontaneously extends in a straight line state from the right side face of the right airbag section 11 to the left side face of the left airbag section 12.

In the method of manufacturing the airbag 10A, too, since the outer face of the airbag 10A is constituted by the two panels, namely, the inside panel 20 and the outside panel 30, the labor of sewing the panels can be less on the whole.

Therefore, according to the method of manufacturing the airbag 10A, the airbag 10A in which the right side face of the right airbag section 11 and the left side face of the left airbag section 12 are connected by each tether belt 80 can be easily manufactured.

In this embodiment, too, the opposite sides 61, 62 of the right flap 60D and the left flap 60E are sewn together and then, the lower edge portions of the inside panel 20 and the outside panel 30 are sewn together, and then, the peripheral edge portions of the openings 18, 18 of the right side 20R and the left side 20L are sewn together, and then, the remaining peripheral edge portions of the inside panel 20 and the outside panel 30 are sewn together, but the order in which the respective parts are sewn is not limited to the above.

The constitution of the airbag device provided with the airbag 10A and the operation of the airbag device are similar to those of the embodiment in the above-mentioned FIGS. 1 to 14.

In this airbag 10A, since the right side face of the right airbag section 11 and the left side face of the left airbag section 12 are connected by the tether belt 80, if the airbag 10A is inflated, the widths in the lateral direction of the right airbag section 11 and the left airbag section 12 are regulated by the tether belt 80, respectively. Therefore, even if an inflator with a relatively low output is used, the airbag 10A is rapidly inflated.

All the above embodiments are examples of the present invention, and the present invention is not limited to the above embodiments.

Figure 31:
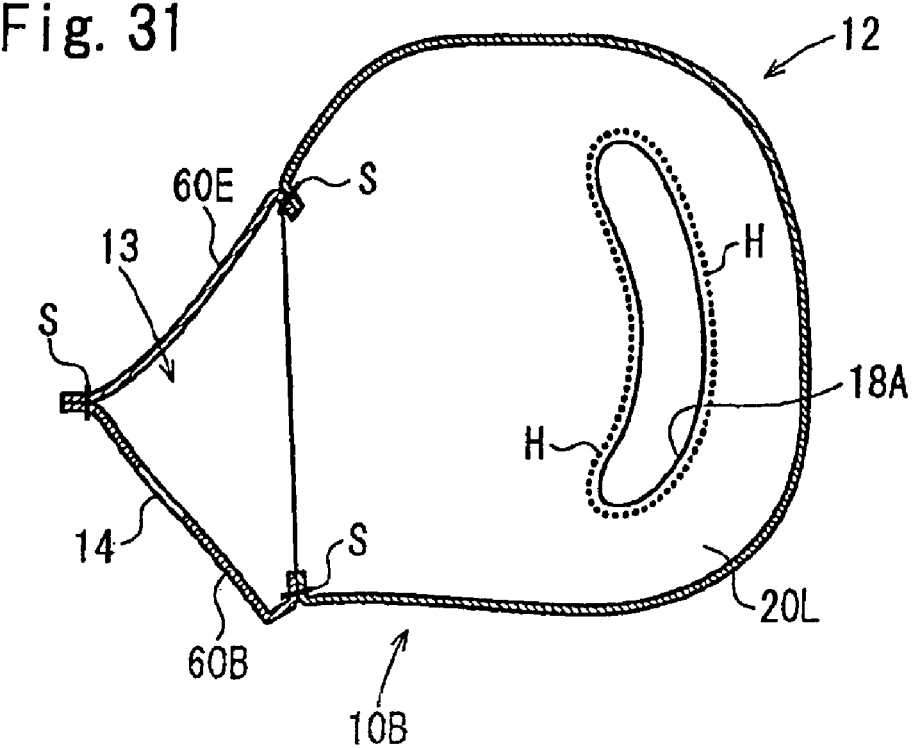
FIG. 31 is a vertical sectional view of the airbag illustrating another example configuration of an opening.
Figure 32:
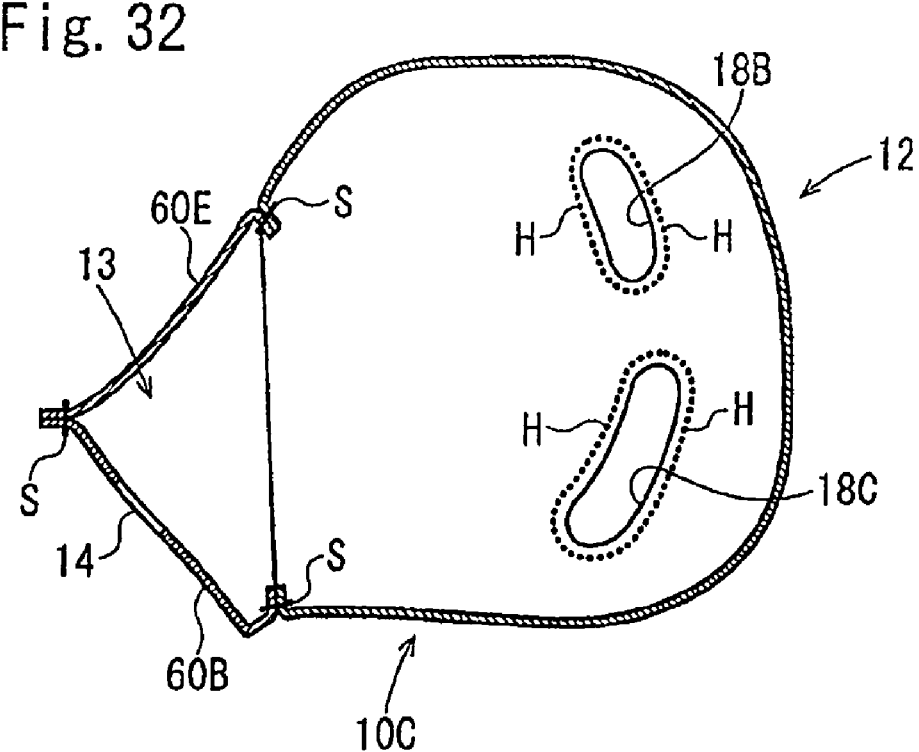
FIG. 32 is a vertical sectional view of the airbag illustrating another example configuration of the opening.

In each of the above embodiments, a single circular opening 18 is provided as an opening having the right airbag section 11 and the left airbag section 12 communicate with each other, but the configuration such as shape, number and arrangement of the opening is not limited to that. FIGS. 31, 32 are vertical sectional views of airbags 10B, 10C illustrating other configuration examples of the opening.

In the airbag 10B in FIG. 31, an opening 18A having an elongated slit shape extending substantially in the vertical direction is provided. This opening 18A continuously extends from the vicinity of the upper end to the vicinity of the lower end when the right airbag section 11 and the left airbag section 12 (FIG. 31 shows only the left airbag section 12) are inflated. Also, the opening 18A is curved to project toward the distal end sides of the airbags 11, 12 along the distal end face when the right airbag section 11 and the left airbag section 12 are inflated.

In the airbag 10C in FIG. 32, two openings 18B, 18C are provided. The openings 18B, 18C have a vertically elongated long hole shape and each of them is shorter than half the length of the opening 18A in FIG. 31. The openings 18B, 18C are arranged substantially in the vertical direction and at positions different from each other in a direction along the distal end faces of the right airbag section 11 and the left airbag section 12 in inflation.

It is needless to say that the opening may be of a configuration other than the above in the present invention.

Each of the above embodiments is an application example of the present invention to the method of manufacturing a passenger airbag for an automobile, but the present invention can be applied to a method of manufacturing an airbag for a driver or a rear seat of an automobile, for example.

The present application is based on Japanese Patent Application (No. 2007-065246) filed on Mar. 14, 2007, and the entirety thereof is incorporated by reference.

The invention claimed is:

1. A method of manufacturing an airbag inflated by a expelled gas of an inflator arranged at a base end side in a direction in which a distal end side is separated from the base end side, the airbag having:
    a left airbag section inflated on the left side in front of an occupant;
    a right airbag section inflated on the right side in front of the occupant; and
    a base end chamber with which sides opposite the occupant of the left airbag section and the right airbag section communicate, wherein
    an opening is provided in each of opposing faces of the left airbag section and right airbag section, respectively, edge portions of each of the openings are sewn together, and the left airbag section and the right airbag section communicate with each other through the openings,
    the airbag being constituted by:
    a single inside panel constituting the opposing face of the left airbag section and the opposing face of the right airbag section; and
    a single outside panel constituting a left side face of the left airbag section, an occupant opposite face of the airbag, and a right side face of the right airbag section sewn together, the method of manufacturing the airbag comprising steps of:
    overlapping the inside panel and the outside panel in a double-folded state so that a left-side opposing face constituting portion constituting the opposing face of the left airbag section and a right-side opposing face constituting portion constituting the opposing face of the right airbag section in the inside panel are overlapped with each other such that airbag inner side faces thereof oppose each other, a left-side face constituting portion constituting the left side face of the left airbag section in the outside panel and the left-side opposing face constituting portion of the inside panel are overlapped with each other such that airbag outer side faces thereof oppose each other, and a right-side face constituting portion constituting the right side face of the right airbag section in the outside panel and the right-side opposing face constituting portion of the inside panel are overlapped with each other such that the airbag outer side faces of them oppose each other;
    main sewing of sewing peripheral edge portions of a part of the peripheral edge portions of the outside panel along the base end chamber together and sewing the peripheral edge portions of the inside panel and the outside panel together;

sewing an opening peripheral edge portion at the beginning, in the middle or after the main sewing process, in which the inside panel is reversed at least partially so that at least the peripheral edge portion of the opening of the left-side opposing face constituting portion of the inside panel and the peripheral edge portion of the opening of the right-side opposing face constituting portion are overlapped with each other such that the airbag outer side faces thereof oppose each other and then, the peripheral edge portions of the openings are sewn together;

reversing the outside panel and the inside panel through an unsewn portion made up of a remaining portion along the base end chamber in the peripheral edge portion of the outside panel after that; and sealing and sewing to seal the unsewn portion by sewing.

2. The method manufacturing an airbag according to claim 1, wherein in the airbag, a tether belt connecting a left side face of the left airbag section and a right side face of the right airbag section through said opening is provided;

the tether belt is constituted by a connected body of a left half tether on the left airbag section side and a right half tether on the right airbag section side; and before said overlapping process, one end of the left half tether is sewn to a region to oppose the opening in an airbag inner side face of the left side face constituting portion of the outside panel, while one end of the right half tether is sewn to a region to oppose the opening in the airbag inner side face of the right side face constituting portion of the outside panel.

3. The method manufacturing an airbag according to claim 2, wherein, after the reversing process, the other end side of one of the left half tether and the right half tether is inserted through said opening and then, the other end sides of both the left half tether and the right half tether are extended to outside the airbag through said unsewn portion, the other end sides of the left half tether and the right half tether are sewn together and then, the connected body of the left half tether and the right half tether is returned into the inside of the airbag and then, the sealing and sewing process is performed.

* * * * *